United States Patent
Romera Joliff et al.

(10) Patent No.: US 8,836,643 B2
(45) Date of Patent: Sep. 16, 2014

(54) AUTO-MORPHING ADAPTIVE USER INTERFACE DEVICE AND METHODS

(75) Inventors: Maria Romera Joliff, San Diego, CA (US); Brian Momeyer, San Diego, CA (US); Babak Forutanpour, San Diego, CA (US); Devender Yamakawa, San Diego, CA (US); Samuel J. Horodezky, San Diego, CA (US); Jonathan Kies, San Diego, CA (US); James P. Mason, Atlanta, GA (US); Jadine N. Yee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 12/861,566

(22) Filed: Aug. 23, 2010

(65) Prior Publication Data

US 2011/0304550 A1 Dec. 15, 2011

Related U.S. Application Data

(60) Provisional application No. 61/353,577, filed on Jun. 10, 2010.

(51) Int. Cl.
| | |
|---|---|
| *G06F 3/02* | (2006.01) |
| *G09G 5/00* | (2006.01) |
| *G06F 3/01* | (2006.01) |
| *G06F 3/0488* | (2013.01) |

(52) U.S. Cl.
CPC ...... *G06F 3/016* (2013.01); *G06F 2203/04809* (2013.01); *G06F 3/04886* (2013.01)
USPC .......................................................... 345/168

(58) Field of Classification Search
None
See application file for complete search history.

(56) References Cited

U.S. PATENT DOCUMENTS

| 7,138,985 B2 | 11/2006 | Nakajima |
| 7,382,357 B2 | 6/2008 | Panotopoulos et al. |
| 8,077,021 B2 * | 12/2011 | Eldering .................... 340/407.2 |

(Continued)

FOREIGN PATENT DOCUMENTS

| JP | H09325688 A | 12/1997 |
| JP | 2004101677 A | 4/2004 |

(Continued)

OTHER PUBLICATIONS

International Search Report and Written Opinion—PCT/US2011/026830—ISA/EPO—Jun. 21, 2011 (100696WO).

*Primary Examiner* — Kent Chang
*Assistant Examiner* — Nathan Brittingham
(74) *Attorney, Agent, or Firm* — James T. Hagler

(57) ABSTRACT

An adaptive user interface device capable of implementing multiple modes of input and configuration may adapt to current user inputs, and may include configuration changes. In an aspect, an adaptive user interface device may be configured for a finger sensing in a touchpad mode, and configured for stylus sensing in a digital tablet mode. In another aspect, surface features of the adaptive user interface device may change shape, such as by raising buttons in response to entering a keyboard or keypad mode. Various mechanisms may be used for raising buttons, and may enable presenting buttons in a variety of shapes and locations on the interface. The configuration of the adaptive user interface device may depend upon the user actions and user identity. Configuration modes may be organized according to many levels enabling a single user interface to support a large number of input options functionality within a limited surface area.

96 Claims, 20 Drawing Sheets

(56) References Cited

U.S. PATENT DOCUMENTS

| | | |
|---|---|---|
| 8,179,377 B2 * | 5/2012 | Ciesla et al. ............... 345/173 |
| 2005/0030292 A1 * | 2/2005 | Diederiks ................... 345/173 |
| 2005/0225538 A1 * | 10/2005 | Verhaegh .................... 345/173 |
| 2006/0231550 A1 * | 10/2006 | Wendel et al. .............. 219/700 |
| 2006/0238510 A1 * | 10/2006 | Panotopoulos et al. ...... 345/168 |
| 2006/0284853 A1 * | 12/2006 | Shapiro ....................... 345/173 |
| 2008/0150911 A1 | 6/2008 | Harrison |
| 2008/0303796 A1 * | 12/2008 | Fyke ............................ 345/173 |
| 2009/0025765 A1 * | 1/2009 | Behm et al. ................. 135/66 |
| 2009/0128305 A1 * | 5/2009 | Mortimer et al. ........... 340/407.1 |
| 2009/0244030 A1 | 10/2009 | Kimura et al. |
| 2009/0250267 A1 | 10/2009 | Heubel et al. |
| 2009/0315832 A1 | 12/2009 | Gray |
| 2010/0134423 A1 * | 6/2010 | Brisebois et al. ............ 345/173 |
| 2010/0231550 A1 * | 9/2010 | Cruz-Hernandez et al. .. 345/174 |

FOREIGN PATENT DOCUMENTS

| | | |
|---|---|---|
| JP | 2006285785 A | 10/2006 |
| JP | 2008070009 A | 3/2008 |
| JP | 2009003867 A | 1/2009 |
| JP | 2009239410 A | 10/2009 |
| JP | 2011519082 A | 6/2011 |
| WO | WO-2009123769 A1 | 10/2009 |

* cited by examiner

AUTO-MORPHING ADAPTIVE USER INTERFACE DEVICE AND METHODS

RELATED APPLICATIONS

This application claims the benefit of priority to U.S. Provisional Application No. 61/353,577 entitled "Auto-morphing Adaptive User Interface Device and Methods" filed Jun. 10, 2010, the entire contents of which are hereby incorporated by reference.

FIELD OF THE INVENTION

The present invention relates generally to computer user interface systems and more particularly to a user interface capable of adapting between alternate configurations.

BACKGROUND

Many computer systems rely upon user interface devices to receive commands and data inputs from users. A few types of user interface devices have become standard, including the keyboard, computer mouse, touchpads, touchscreen displays, and trackballs. Such conventional user interface devices are specialized for particular types of input tasks, such as entering text or type commands (e.g., a keypad or keyboard) and navigating within a graphical user interface (e.g., a computer mouse or trackball). Users typically have to switch between two input devices in the course of daily tasks, such as between a keyboard and a mouse Touchscreen displays have become popular for some computing devices since they enable navigation and data input (e.g., via a virtual keyboard). However, touchscreen user interfaces do not provide raised keys, and therefore are ergonomically and haptically less satisfying than a physical keyboard for text entry. Onscreen keyboards are not as easy to use and do not provide the tactile feedback of hard keys.

SUMMARY

The various aspects include an adaptive user interface device for receiving user inputs to a computing device in which a user interface surface is configured to change operating modes in response to user inputs or operating states of applications or the computing device. Such changing operating modes may include changing functionality and/or the shape of the user interface surface. An aspect includes a method of configuring such an adaptive user interface device configured to receive user inputs that includes adapting a mode of operation of the adaptive user interface device, in which adapting a mode of operation may be selected from the group consisting of adjusting a sensitivity of the user interface device to user inputs, and changing a shape of the adaptive user interface device. In an aspect, the method may further include sensing a user input on the adaptive user interface device, determining an operating mode compatible with the sensed user input, and implementing the identified compatible user input mode by configuring the adaptive user interface device. In a further aspect, adapting a mode of operation of the adaptive user interface device may include selecting one of a touchpad mode and a stylus activated digital tablet mode.

In another aspect, adapting a mode of operation of the adaptive user interface device may include changing a shape of a portion of the surface of the adaptive user interface device. The method of this aspect may further include determining an acceptable location for a user's finger on the surface of the adaptive user interface device, determining a current location of the user's finger on the surface of the adaptive user interface device, and raising a portion of the surface of the adaptive user interface device so as to guide the user's finger in the direction of the determined acceptable location when it is determined that the current location of the user's finger is not at the determined acceptable location. In an aspect, changing a shape of the adaptive user interface device may include raising a button on the surface of the adaptive user interface device in a first mode and lowering the button flush with the surface of the adaptive user interface device in a second mode; and raising a button on the surface of the adaptive user interface device may include raising a plurality of buttons in a form a keyboard, keypad, game interface or other form of user interface structure. In a further aspect, raising a button on the surface of the adaptive user interface device may include raising a plurality of buttons in a form of a keyboard configured in size and orientation based on an identity of a user of the adaptive user interface device. In a further aspect, the adaptive user interface device may include one or more visual elements and the method may include activating the one or more visual elements on the surface of the adaptive user interface device.

In a further aspect, the method may include determining an operating state of a computing device coupled to the adaptive user interface device, determining a suitable configuration mode for the adaptive user interface based upon the determined current operating state, and implementing the determined configuration mode by raising a plurality of buttons on the surface of the adaptive user interface device with shapes and locations defined by the determined configuration mode. In this aspect, the shapes and locations of the plurality of raised buttons may convey information regarding a functionality associated with each of the raised buttons. In this aspect, the method may further include activating one or more visual elements on the surface of the adaptive user interface device in a manner that communicates information regarding the functionality associated with each of the raised buttons.

In a further aspect, the method may include determining a menu state of a computing device coupled to the adaptive user interface device, in which raising a button on the surface of the adaptive user interface device includes raising a plurality of buttons in a format defined by the menu state. In this aspect, the menu state may be specified in an application executing on the computing device. In this aspect, the method may further include sensing a press of one of the plurality of buttons, determining a functionality associated with the pressed one of the plurality of buttons, executing a command in the computing device if the functionality associated with the pressed one of the plurality of buttons is determined to be an executable command, and changing the menu state and raising a plurality of buttons in a format defined by the changed menu state if the functionality associated with the pressed one of the plurality of buttons is determined to be a selection of another user interface menu. In this aspect, the shapes and locations of the plurality of raised buttons may convey information regarding the functionality associated with each of the raised buttons. In a further aspect, the method may further include activating a plurality of visual elements on the surface of the adaptive user interface device in a manner that communicates information regarding the functionality associated with each of the plurality of buttons.

In further aspect, a computing device may include a processor coupled to an adaptive user interface surface configured to send signal to the processor in response to receiving a user touch to the user interface surface, in which the processor may be configured with processor-executable instructions to perform operations including adapting a mode of operation of the user interface surface, in which adapting a mode of operation may be selected from adjusting a sensitivity of the adaptive user interface surface to user inputs, and changing a shape of the adaptive user interface surface. In a further aspect the processor may be configured with processor-executable instructions to perform operations further including receiving a signal from the adaptive user interface surface indicating a user input on the user interface surface, determining an operating mode compatible with the indicated user input, and implementing the identified compatible user input mode by configuring the adaptive user interface surface. In a further aspect the processor may be configured with processor-executable instructions to perform operations such that adapting a mode of operation of the adaptive user interface surface includes selecting one of a touchpad mode and a stylus activated digital tablet mode.

In a further aspect, the adaptive user interface surface may be configured to be raised and lowered in response to commands received from the processor, and the processor may be configured with processor-executable instructions to perform operations such that adapting a mode of operation of the adaptive user interface surface includes sending signals to the adaptive user interface surface to cause it to change a shape of a portion of the user interface surface. In an aspect, the processor may be configured with processor-executable instructions to perform operations including determining an acceptable location for a user's finger on the user interface surface, determining a current location of the user's finger on the user interface surface, and sending signals to the adaptive user interface surface to cause it to raise a portion of the adaptive user interface surface so as to guide the user's finger in the direction of the determined acceptable location when it is determined that the current location of the user's finger is not at the determined acceptable location. In a further aspect, the processor may be configured with processor-executable instructions to perform operations and the adaptive user interface surface may be configured such that changing a shape of the adaptive user interface surface includes raising a button on the adaptive user interface surface in a first mode and lowering the button flush with the adaptive user interface surface in a second mode. In a further aspect, the processor may be configured with processor-executable instructions to perform operations and the adaptive user interface surface may be configured such that raising a button on the adaptive user interface surface includes raising a plurality of buttons in a form of one of a keyboard, a keypad, and a game interface. In a further aspect, the processor may be configured with processor-executable instructions to perform operations and the adaptive user interface surface may be configured such that raising a button on the adaptive user interface surface includes raising a plurality of buttons in a form of a keyboard configured in size and orientation based on an identity of a user of the computing device. In a further aspect, the adaptive user interface surface may further include one or more visual elements coupled to the processor, and the processor may be configured with processor-executable instructions to perform operations further including activating the one or more visual elements on the user interface surface.

In a further aspect, the computing device processor may be configured with processor-executable instructions to perform operations further including determining an operating state of the computing device, determining a suitable configuration mode for the user surface based upon the determined current operating state, and implementing the determined configuration mode by sending signals to the adaptive user interface surface to cause it to raise a plurality of buttons with shapes and locations defined by the determined configuration mode. In the aspect, the processor may be configured with processor-executable instructions to perform operations such that the shapes and locations of the plurality of raised buttons conveys information regarding a functionality associated with each of the raised buttons. Further in this aspect, the adaptive user interface surface may further include one or more visual elements coupled to the processor, and the processor may be configured with processor-executable instructions to perform operations further comprising activating the one or more visual elements on the adaptive user interface surface in a manner that communicates information regarding the functionality associated with each of the raised buttons.

In a further aspect, the computing device processor may be configured with processor-executable instructions to perform operations further comprising determining a menu state of the computing device, in which raising a button on the adaptive user interface surface includes raising a plurality of buttons in a format defined by the menu state. In this aspect, the processor may be configured with processor-executable instructions to perform operations such that the menu state may be specified in an application executing on the computing device.

In a further aspect, the computing device processor may be configured with processor-executable instructions to perform operations further including receiving a signal from the adaptive user interface surface indicating a press of one of the plurality of buttons, determining a functionality associated with the pressed one of the plurality of buttons, executing a command in the computing device if the functionality associated with the pressed one of the plurality of buttons is determined to be an executable command, and changing the menu state and sending signals to the adaptive user interface surface to raise a plurality of buttons in a format defined by the changed menu state if the functionality associated with the pressed one of the plurality of buttons is determined to be a selection of another user interface menu. In this aspect, the processor may be configured with processor-executable instructions to perform operations such that the shapes and locations of the plurality of raised buttons conveys information regarding the functionality associated with each of the raised buttons. Further in this aspect, the adaptive user interface surface may include a plurality of visual elements coupled to the processor, and the processor may be configured with processor-executable instructions to perform operations further comprising activating the plurality of visual elements on the adaptive user interface surface in a manner that communicates information regarding the functionality associated with each of the plurality of buttons.

In a further aspect, computing device adaptive user interface surface includes a piezoelectric actuator configured to raise a portion of the adaptive user interface surface in response to signals received from the processor. In this aspect, the adaptive user interface surface may include Macro Fiber Composite elements comprising rectangular piezo ceramic rods sandwiched between layers of adhesive and electroded polyimide film.

In a further aspect, computing device adaptive user interface surface includes a fluid pocket, a valve coupled to the fluid pocket and to the processor, and configured to open and close in response to signals received from the processor, and a fluid pump fluidically coupled to the valve.

In a further aspect, computing device adaptive user interface surface includes an electrostatically activated portion electrically coupled to the processor. In this aspect, the electrostatically activated portion may include first and second surface layers separated by an insulator layer, in which the first and second surface layers may be electrically coupled to the processor so that the processor can selectively apply same or different voltages to the first and second surface layers, and in which the processor may be configured with processor-executable instructions to perform operations further comprising applying voltages of a same polarity to the first and second surface layers to raise the electrostatically activated portion.

In a further aspect, computing device adaptive user interface surface includes a magnetically activated portion electrically coupled to the processor. In this aspect, the magnetically activated portion comprises a permanent magnet and an electromagnet separated by a separator layer, in which the electromagnet may be electrically coupled to the processor so that the processor can generate a magnetic field by applying a current to the electromagnet, and the processor may be configured with processor-executable instructions to perform operations further comprising applying a current to the electromagnet to raise the magnetically activated portion of the user interface surface.

A further aspect includes a computing device including a means for accomplishing some or all of the functions of the aspect method described above.

A further aspect includes a non-transitory processor-readable storage medium having stored thereon processor-executable instructions configured to cause a processor of a computing device coupled to an adaptive user interface surface to perform operations of the aspect method described above.

In a further aspect, an adaptive user interface device includes a user interface surface configured to change a shape in response to a signal from a processor coupled to the adaptive user interface device. In this aspect, the user interface surface may include one or more visual elements configured to generate a visual image in response to a signal from a processor coupled to the adaptive user interface device. In this aspect, the user interface surface may include an actuator configured to raise a portion of the user interface surface in a first mode and lowering the portion of the surface flush with the user interface surface in a second mode. In this aspect, the user interface surface may include a plurality of actuators in a form of a keyboard, a keypad, a game interface or another user interface device, in an aspect, the plurality of actuators may be configured to raise a plurality of buttons in a form of a keyboard configured in size and orientation based on an identity of a user of the adaptive user interface device. In an aspect, the user interface surface may include a plurality of actuators controllable by a processor coupled to the adaptive user interface device and configured to be individually actuated to each raise a portion of an exterior of the user interface surface in response to signals from a processor coupled to the adaptive user interface device. In an aspect, the user interface surface may be configured to detect a press of a raised portion of the user interface surface, and send a signal to the processor coupled to the adaptive user interface device indicating that the raised portion of the user interface surface was pressed. In a further aspect, the actuator may be one of a piezoelectric actuator, such as a Macro Fiber Composite element including rectangular piezo ceramic rods sandwiched between layers of adhesive and electroded polyimide film. In another aspect, the actuator may be a fluidic actuator including a fluid pocket, a valve coupled to the fluid pocket and configured to open and close in response to signals received from the processor coupled to the adaptive user interface device, and a fluid pump fluidically coupled to the valve. In another aspect, the actuator may be an electrostatic actuator, which may include first and second surface layers separated by an insulator layer, in which the first and second surface layers may be electrically coupled to the processor so that the processor can selectively apply same or different voltages to the first and second surface layers. In another aspect, the actuator may be a magnetic actuator, which may include a permanent magnet and an electromagnet separated by a separator layer, in which the electromagnet is electrically coupled to the processor so that the processor can generate a magnetic field by applying a current to the electromagnet.

In another aspect, an adaptive user interface device may include a user interface surface, and a means for changing shape of the user interface surface in response to a signal from a processor coupled to the adaptive user interface device, and/or a means for generating a visual image in response to a signal from a processor coupled to the adaptive user interface device. In an aspect, the user interface surface may include a means for raising a portion of the user interface surface in a first mode and lowering the portion of the surface flush with the user interface surface in a second mode. In an aspect, the user interface surface may include a means for raising a plurality of buttons in a form of one of a keyboard, a keypad, a game interface, and/or another user interface device. In an aspect, the user interface surface may include a means for raising a plurality of buttons in a form of a keyboard configured in size and orientation based on an identity of a user of the adaptive user interface device. In an aspect, the user interface surface may include a means for individually raising small portions of the user interface surface in response to signals received from the processor coupled to the adaptive user interface device. In an aspect, the user interface surface may include a means for detecting a press of a raised portion of the user interface surface, and a means for sending a signal to the processor coupled to the adaptive user interface device indicating that the raised portion of the user interface surface was pressed.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The various aspects include systems and methods that provide an adaptive user interface device which can be automatically configured to receive a variety of different types of user input. In a first aspect, the adaptive user interface device can function as a touchscreen responsive to finger touches, and when touched with a stylus, adapt to function as a digital tablet receiving input from the stylus. In a second aspect, the adaptive user interface device may raise or lower buttons in fixed positions enabling it to transform between a flat touch surface and a keypad or keyboard of raised buttons. In a third aspect, the adaptive user interface device may raise or lower buttons anywhere on the surface of the interface, with the shape, configuration, and orientation of the raised button being configurable by application or operating system software. In an aspect, the reconfiguration of the adaptive user interface may be accomplished automatically in response to the sensed user inputs and/or operating system (e.g., available button function options or a menu state). In an aspect, a computing device may anticipate a mode of user interactions based upon a received input (e.g., a touch on the touch surface), and present a configuration (e.g., a particular set of raised buttons) consistent with that anticipated interaction. The various aspects may be implemented in a variety of applications, particularly in applications where a variety of different user input interfaces and configurations would be desirable. Additionally, aspects which enable the dynamic placement of buttons anywhere on the surface of the interface may enable menu/button tree configurations which can be interpreted by users simply by feeling the location and shapes of the raised buttons, thereby providing users with a physical user interface with which users can interact with sophisticated systems without the need to look at a graphical user interface display. In a further aspect, the adaptive user interface surfaces may be positioned on any touchable surface of a computing device or apparatus connected to a computing device, and not just on a flat (e.g., tablet) surface or visual display surface.

Figure 1A:
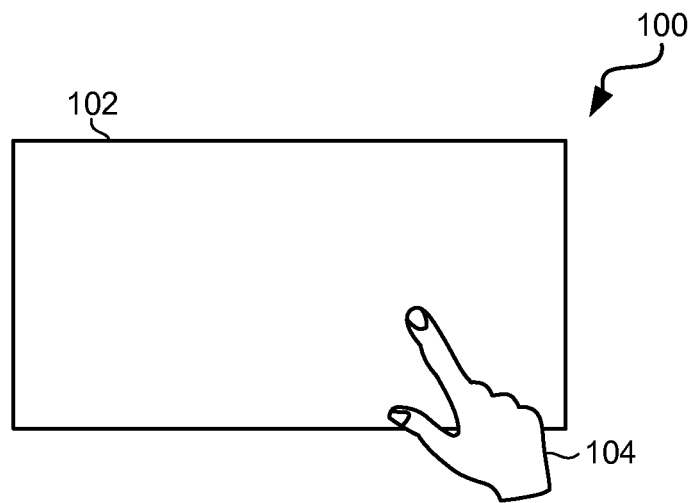
FIGS. 1A and 1B are diagrams of an adaptive user interface configured as a touch pad and as a digital tablet for accepting inputs from a stylus according to an aspect.
Figure 1B:
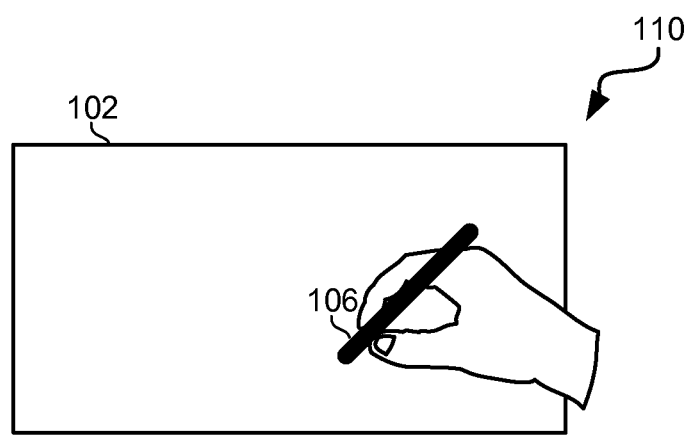

In the various aspects, the adaptive user interface device may adapt the user interface within a current mode of input or morph the user interface into a totally different mode of input. In an aspect illustrated in FIGS. 1A and 1B, the adaptive user interface 102 may be in the form of a tablet that can function as a touchpad 100 that can sense user finger 104 touches operating in a touch pad mode, and can provide such inputs to an attached computer, and upon sensing the touch of a stylus 106 to the surface, transform into a digital writing pad 110 configured to receive inputs from the stylus 106. In this aspect, the adaptive user interface 102 may exhibit a first level of sensitivity to touches suitable for receiving user inputs in the form of finger strokes on the surface, and a second level of sensitivity suitable for receiving user inputs in the form of stylus strokes on the surface. For example, the sensitivity of the touch surface may be reconfigured to accommodate the smaller contact surface with higher local contact pressure associated with a stylus 106 pressing against the surface of the adaptive user interface device. Additionally, the sensing mechanisms may be modified or recalibrated to take advantage of a different type of physical interaction provided by a stylus 106 as compared to a finger touch. For example, an adaptive user interface 102 may be configured to sense a user's finger touch using capacitive sensors in a touchpad mode 100, and transform to recognizing stylus strokes based on a different set of electrical signals that may be provided by a metal stylus in a digital tablet mode 110.

Figure 2A:
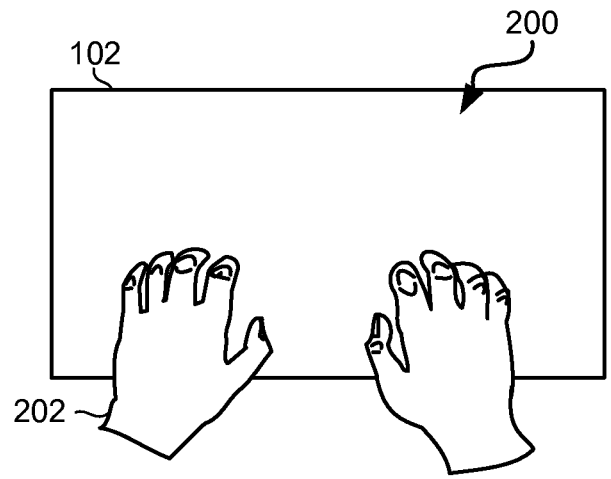
FIGS. 2A and 2B are diagrams of an adaptive user interface before and after morphing into a keyboard input mode.
Figure 2B:
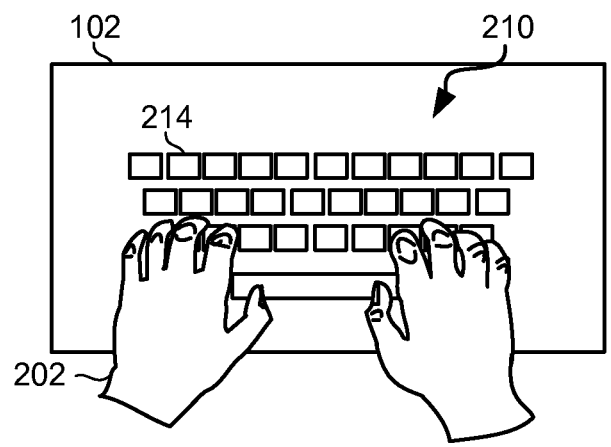

In another aspect illustrated in FIGS. 2A and 2B, the adaptive user interface 102 may be configured to function as a touchpad or digital tablet in a first mode 200, and transform or morph into the a keyboard mode by raising preconfigured buttons 214 that are actuated to rise up to form a keyboard interface 210. Such buttons 214 may be actuated by any of the actuation mechanisms described herein. By providing actuating buttons 214 that raise up in a keyboard mode but retract to form a smooth surface in a touchpad mode, the adaptive user interface device can function as a touch surface or digital tablet to receive touch-type user inputs, and as a conventional keyboard to receive conventional data entry user inputs. Further, the keyboard configuration mode may be activated only when certain user inputs are to be expected, such as when a user is authorized to use the computer or make data entry sent to the computer. When not in use, this aspect of the adaptive user interface 102 provides a smooth touchpad surface, which may be suitable for other tasks (such as receiving pointing and drawing inputs) while providing a surface that can easily be cleaned. For example, this aspect of the adaptive user interface device may be particularly useful in a hospital setting, since the interface device surface returns to a flat configuration when not in the keyboard mode, enabling it to be easily cleaned and sterilized. Since the buttons 214 rise up from the surface level, there may be no gaps or grooves in which germs can hide. This aspect of the adaptive user interface device may similarly be useful in a factory setting in which manufacturing machine control buttons may be raised only when the machine is in an operating state to receive user inputs. At other times, adaptive user interface may present a smooth surface that easily can be cleaned of dirt and grime. Since there are no openings or grooves between buttons 214, there are far less opportunities for dirt and machining particles to become lodged in the keyboard. By providing raised keys 214, the keyboard 210 may be easier to use than current user interface devices deployed in factory setting which typically use a plastic sheet over a flat keyboard.

In a third aspect described in more detail below with reference to FIGS. 6 through 16B, the adaptive user interface may be configured with a plurality of actuating elements that can be actuated individually to generate raised portions or buttons 214 anywhere on the interface surface and in a variety of shapes. By adjusting the position in shapes of raised buttons 214, the adaptive user interface 102 can accommodate a wide variety of different operating modes or functionalities, and provide keys that can be have meaning based upon their tactically recognizable shapes. For example, as discussed below with reference FIG. 14, such a generally configurable adaptive user interface may be able to actuate buttons whose shape can be recognized by the user's fingers to convey information regarding the functionality associated with each button. This may allow users to accurately select a particular button without having to look at the keypad, keyboard or a graphical user interface display. Such capabilities may be useful in applications where users cannot divert their attention from a visual activity (e.g., driving a vehicle, flying an airplane, or operating heavy machinery). In a further aspect, the button positions may be responsive to user inputs enabling users to reposition buttons as if moving sliding levers on a conventional physical display.

Figure 3:
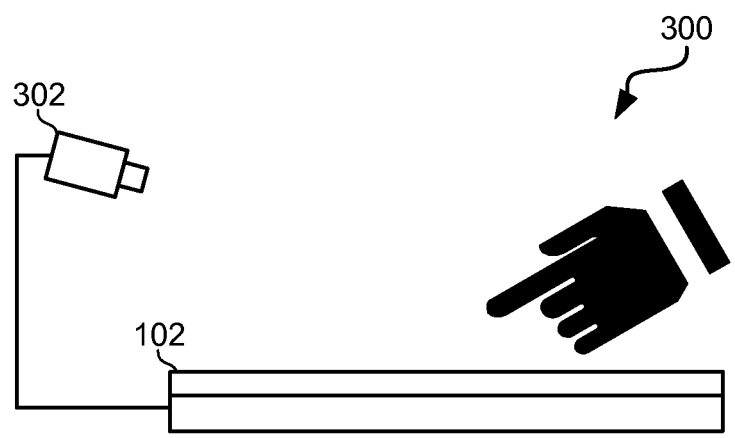
FIG. 3 is a cross-sectional view of an adaptive user interface with a camera for monitoring user input.
Figure 4:
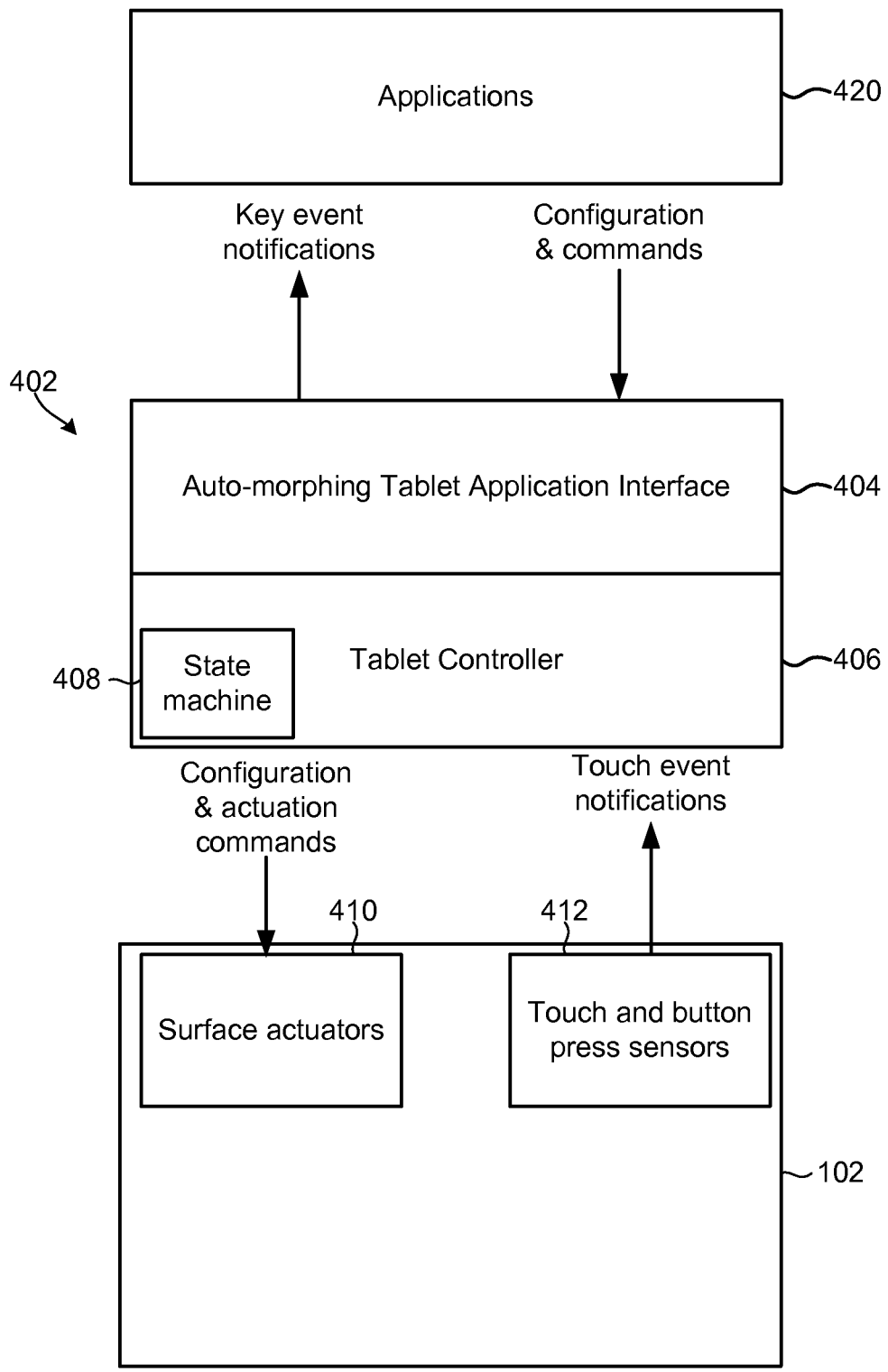
FIG. 4 is a hardware/software architecture diagram illustrating functional components of the various aspects.

In some aspects, the configuration or operating mode of the adaptive user interface may be selected by a user, such as by positioning a switch on the computing device or interface device, or by selecting an option on a user interface menu. In other aspects, a computing device or the adaptive user interface device may be configured to automatically determine an appropriate configuration or operating mode based on a user's interaction with the interface. Various mechanisms for recognizing a user's intended use of the interface may be used. Input may be received directly via the user interface, such as input by touchpad, stylus, or various button modes. Input may be voice or audio commands received over a microphone or receiver. Input may also include gestures or postures of fingers, hands, or other objects where the gestures or postures are recognized by processing data received from cameras, proximity sensors, or other devices. For example, if a user touches the surface of the adaptive user interface with fingertips of both hands as illustrated in FIG. 2A, the attached computing device or adaptive user interface device may recognize this touch event as indicating that a keyboard mode should be activated, as illustrated in FIG. 2B. As another example, user interactions with the interface may be received by a camera 302 as illustrated in FIG. 3. For example, the attached computing device or the adaptive user interface device may be configured to process images received from the camera 302 to determine an orientation of the user's hand(s), and compare this image to images stored in memory to select a corresponding image which may be useful for determining the appropriate configuration or operating mode for the interface device.

To enable applications to interact with an adaptive user interface device 102 which may provide a wide range of command signals, the computing device using such an interface may be configured with an adaptive tablet application interface software module 402 as part of its operating system or a driver for the interface device. Such an adaptive tablet application interface software module 402 may include an application interface portion 404 configured to pass key event notifications to and receive configurations signals and commands from applications 420. The application interface module 404 may serve as a translator so that application developers need not be concerned with the details of receiving commands from an adaptive user interface device. The adaptive tablet application interface software module 402 may also include a tablet controller module 406, which is configured to pass configuration and actuation commands to and receive touch event notifications from the adaptive user interface device 102. The tablet controller module 406 may be configured to specify the coordinates on the tablet surface that are to be actuated or raised in order to generate buttons the particular configuration. Such configuration and actuation commands may be passed to surface actuators 410, such as circuitry which drives individual button raising actuators. Since the location of buttons and the nature of the user inputs may vary based upon the implemented device configuration, the tablet controller module 406 may also be configured to translate received touch event coordinates or button actuations into corresponding commands (e.g. a letter or number associated with a particular pressed button) which can be interpreted by applications. The tablet controller module 406 may also include a state machine 408 configured to support keyboard operations when the adaptive user interface device is configured as a keypad or keyboard.

In operation, when a user touches or otherwise interacts with the adaptive user interface device 102, such as positioning fingertips of both hands in a manner suitable for typing on the keyboard, such interactions may be passed to the tablet controller module 406. The tablet controller 406 may be configured to recognize such an input as indicating that the user desires to enter data into the computer via a keyboard. In response, the tablet controller may transmit configuration and actuation commands to the surface actuators 410 to cause portions of the surface to be raised in the form of a keyboard. Information regarding the locations of finger tips touching the tablet surface may be used by the tablet controller module 406 to determine the appropriate orientation and size of the generated keyboard.

In various aspects, the adaptive tablet application interface 402 may be implemented within software operating in a computing device coupled to the adaptive user interface device 102, or may be implemented within a processor that is part of the adaptive user interface device 102.

Figure 5:
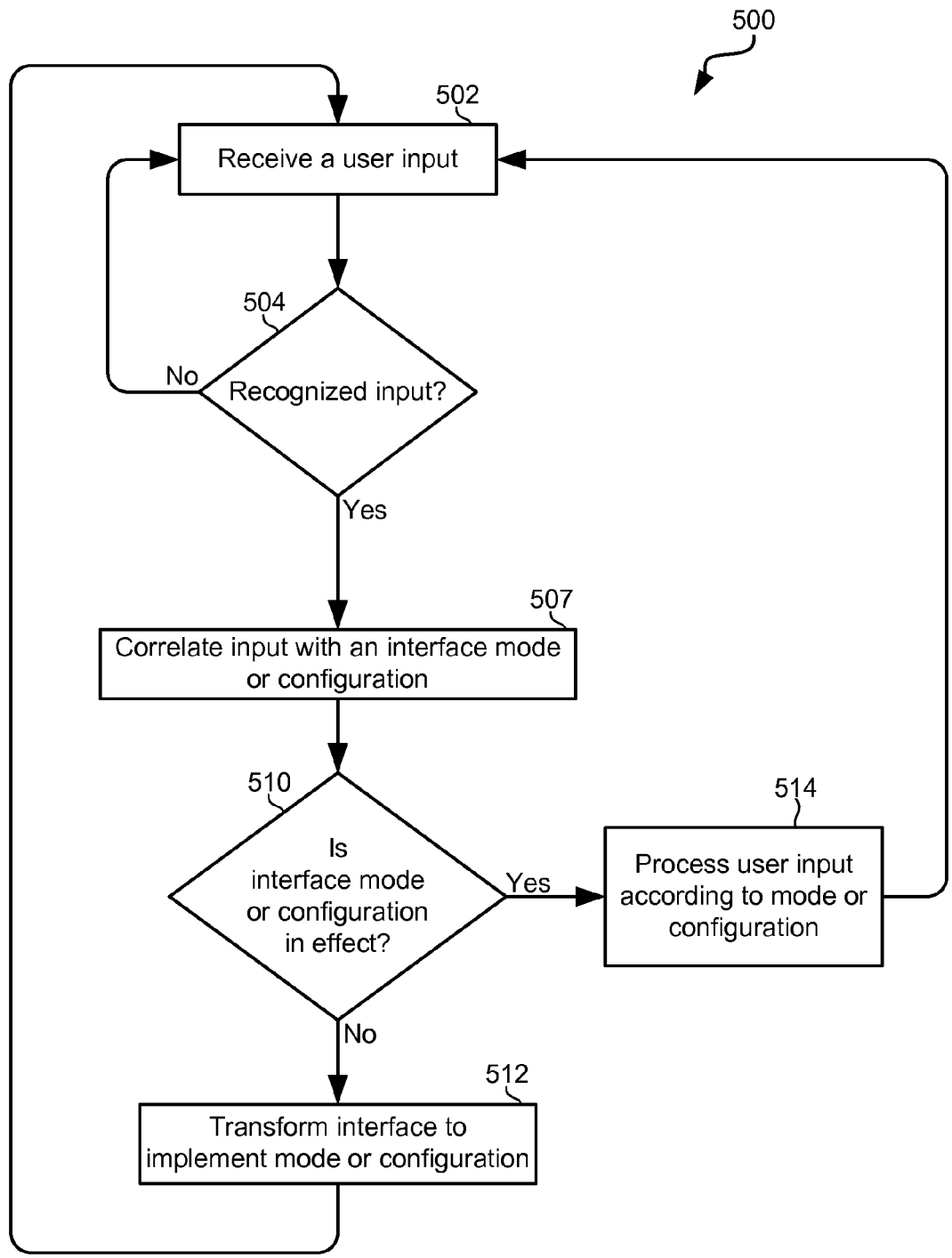
FIG. 5 is a process flow diagram illustrating an overview method according to the various aspects.

FIG. 5 illustrates an example method 500 by which a user interface may rely upon user intent to automatically morph between modes of input. In block 502, an adaptive user interface may present a user input, such as in the form of a touch to the surface by a finger tip or stylus. This user input may be received from a variety of sensors, such as a touch-sensitive surface, a camera imaging the surface, proximity sensors, pressure sensors, and other sensors. In determination block 505, a processor within an attached computing device or within the adaptive user interface device may determine whether the input is recognized as an input correlated to a particular interface mode or configuration. If the user input is not recognized as an understandable user input (i.e., determination block 504="No"), the user interface may ignore the input and return to block 502 to await the next user input.

If the received user input is recognized as meaningful user input (i.e., determination block 504="Yes"), the received input may be correlated with a corresponding interface device mode or configuration in block 507. Different input modes may require different sensor configurations (e.g., sensitivity, sensor interpretation, etc.), and different configurations may require the touch interface to physically change shape, such as raising portions of the surface in order to generate physical buttons. In block 510, the processor may determine whether the detected user interface device is already configured in the correlated input mode or configuration. If the correlated mode or configuration is already in effect (i.e., determination block 504="Yes"), the received input may be processed according to the implemented motor configuration in block 514, with the resulting command information provided to the attached computing device. After the user input is processed in block 514, the processor may return to block 502 to await the next received user input. However, if the correlated mode or configuration is not already in effect (i.e., determination block 504="No"), the adaptive user interface may transform itself into the corresponding mode or configuration in block 512. As described herein, such transformation may include the adaptive user interface physically changing the shape of the surface (e.g., by raising or lowering buttons), recalibrating input sensors, or both.

The various aspects may use a variety of mechanisms for achieving shape changes in the surface of the adaptive user interface device 102. Such shape changing mechanisms may include pneumatic, hydraulic, electric actuator, electrostatic, and magnetic mechanisms. Such shape changing driving actuators are tied to the processor within the adaptive user interface device itself or within a computing device coupled to the interface device so that surface shape changes can be controlled by the processor. Examples of various shape change driving actuators are described below, however different technologies and drive mechanisms may be used with the various aspects.

Figure 6:
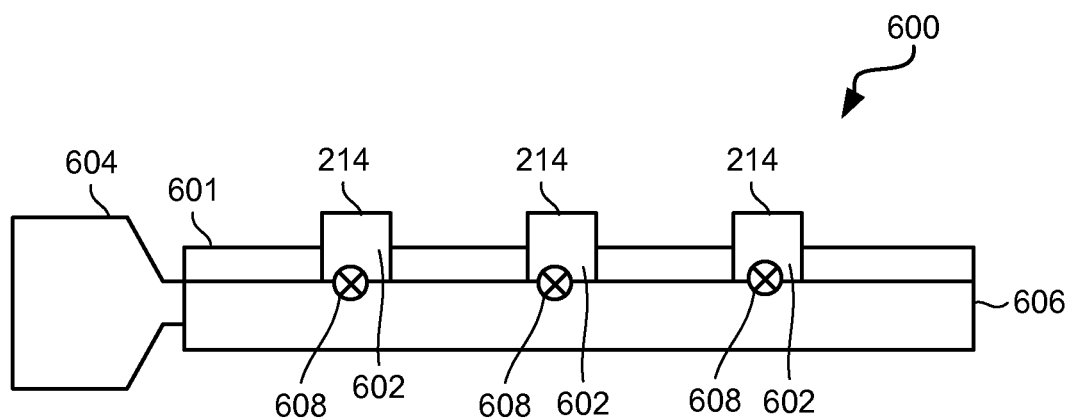
FIG. 6 is a cross-sectional view of an adaptive user interface with inflatable fluid pockets.

FIG. 6 illustrates an adaptive user interface device 600 in which buttons 214 can be raised above the surface 601 interface device via pneumatic or hydraulic pressure applied to the fluid pockets 602. Such fluid pockets 602 may be inflated by a fluid pump 604 which is configured to raise the pressure of a gas or liquid within a plenum or fluid distribution channel 606. Processor controllable valves 608 coupled to each fluid pocket 602 enables a processor to individually actuate buttons 214 or portions of the surface 601 in order to form raised patterns or buttons 214. The pressure system 604 may employ pneumatic or hydraulic pumps to inflate the fluid pockets 602. Buttons 214 may be retracted to return the interface device to a smooth tablet mode by opening each of the valves 608 and the pressurizing the system, such as by deenergizing the pressure system 604. In a further aspect, a second set of processor-controlled valves (not shown) may be coupled to each fluid pockets 602 which when opened may reduce the pressure in the fluid pockets in order to enable a processor to individually raise and lower buttons 214 without the activating the usher system 604. Raised button surfaces 214 may be pressed like conventional buttons. The press of a button 214 may be determined based upon a pressure change within the fluid pocket 602, as may be detected by a pressure sensor (not shown), or by transducers or switches which may convert a button press into an electrical signal that may be interpreted by the attached computer.

Figure 7:
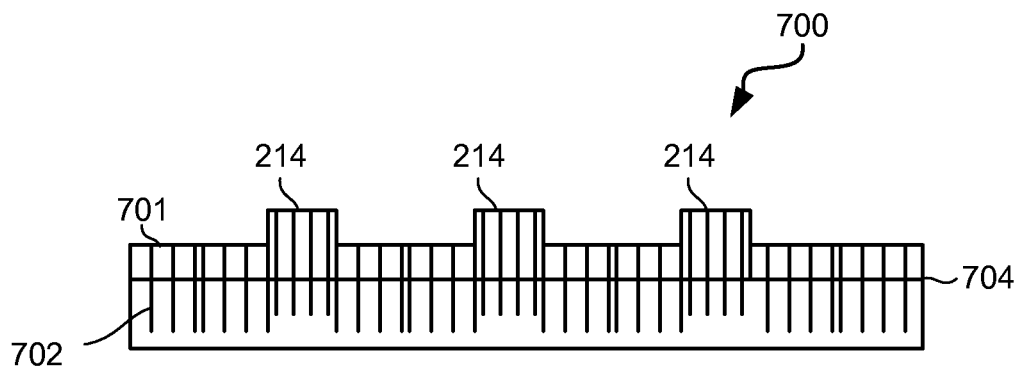
FIG. 7 is a cross-sectional view of an adaptive user interface actuated by pins driven by linear actuators.

FIG. 7 illustrates another example actuator mechanism for an adaptive user interface display which relies on a piezoelectric element to raise portions of the interface surface 701. Piezoelectric materials can be configured to elongate in the presence of an applied electric field. When coupled to a flexible surface 701, a plurality of piezoelectric elements in the interface may be configured to raise the surface in response to individual activation signals, such as to generate raised buttons 214. The piezoelectric elements 702 may be coupled directly to the device surface 701, or may be coupled to mechanical pins which contact the surface. Piezoelectric materials generate an electrical current when subject to mechanical stress. Thus, when a user presses a raised button 214, the piezoelectric materials may generate electric signals that can be measured to detect the button press. Electric fields used to actuate piezoelectric elements 702 may be individually connected to the elements by a processor, such as through an interface of solid state switches that connect the elements to a voltage source. Multiple independently actuating piezoelectric elements 702 can be controlled by a processor to generate any of a variety of raised surface shapes. Even though the amount of displacement achievable with piezoelectric elements may be relatively small, a small change in surface elevation may be sufficient to provide perceptibly raised surface features.

An example of a piezoelectric element that could be used in various aspects is Macro Fiber Composite (MFC) which is manufactured and sold by Smart Material Corp. of Sarasota, Fla. The MFC comprises rectangular piezo ceramic rods sandwiched between layers of adhesive and electroded polyimide film. This film contains interdigitated electrodes that transfer applied voltages directly to and from the ribbon shaped rods. This assembly enables in-plane poling, actuation, and sensing in a sealed, durable, ready-to-use package. When embedded in a surface or attached to flexible structures, the MFC can provide distributed solid-state deflection and vibration control or strain measurements.

Figure 8A:
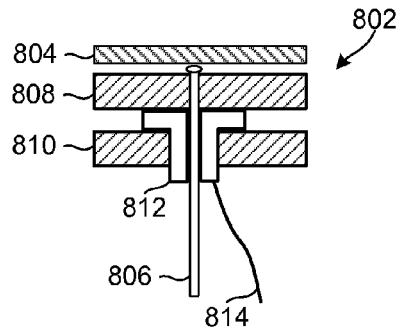
FIGS. 8A-8E are cross-sectional and elevation views showing further details of an adaptive user interface driven actuated by pins driven by linear actuators.
Figure 8B:
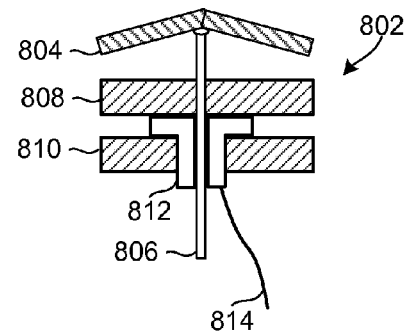

A further example shape changing actuation system is illustrated in FIGS. 8A through 8E. In this example aspect, the surface of an adaptive user interface device 102 may be raised by a plurality of pins individually driven by linear actuator motors. Referring to FIG. 8A, a single actuator 802 may include a pliable surface layer 804 which can be displaced vertically by an underlying pin 806 which is held in place laterally by parallel plates 808 and 810 and driven vertically by a linear actuator 812. The linear actuator 812 may be any suitable linear motor, including linear piezoelectric actuators, solenoid actuators, linear motors, linear stepper motors, etc. Each linear actuator 802 may be driven by an individual electric signal, such as is delivered by a connector 814 which may be coupled to a processor within the attached computing device or within the adaptive user interface device. FIG. 8A illustrates the actuator 802 in the down or deenergized configuration. In this configuration, the pliable surface layer 804 lies flat. FIG. 8B illustrates the actuator 802 in the up or energized configuration, in which the pliable surface layer 804 is raised by pressure applied by the pin 806.

Figure 8C:
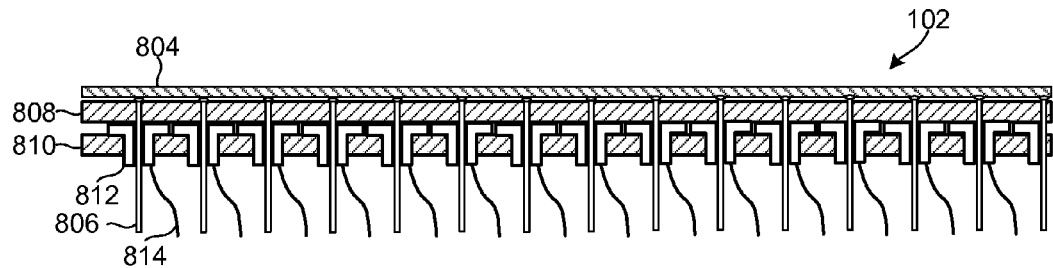
Figure 8D:
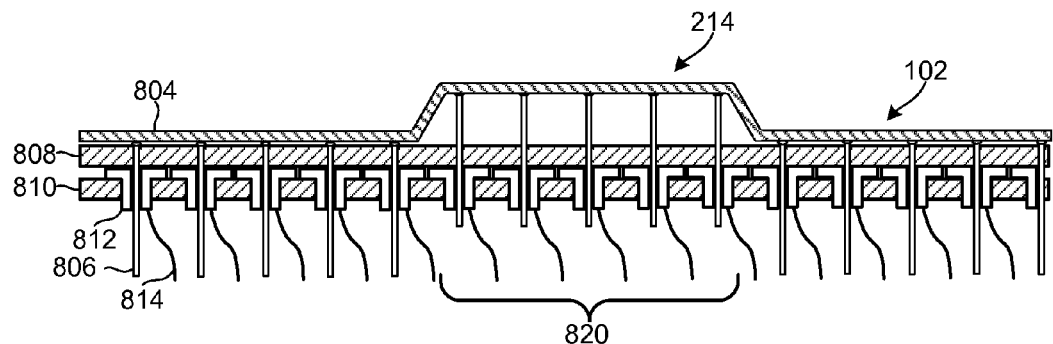
Figure 8E:
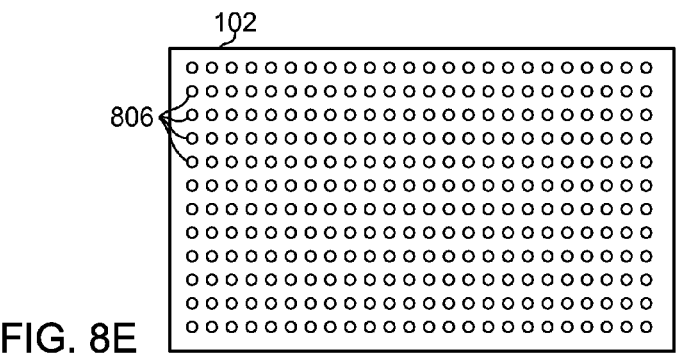

As shown in FIGS. 8C-8E, a plurality of the actuators 802 may be closely spaced and configured in an array in order to be able to raise different portions of the pliable surface layer 804 in response to individual signals applied by the processor via connectors 814. FIG. 8C illustrates the adaptive user interface device 102 in a tablet mode in which none of the actuators 802 are energized.

FIG. 8D illustrates the adaptive user interface device 102 in a keypad or button mode in which a selected portion 820 of the actuators 802 are energized, creating a raised button 214. By organizing or configuring the actuators 802 to be individually energized and arranging them in an array as illustrated in FIG. 8E, a wide variety of different button shapes can be generated. The press of a raised button 214 may be detected based upon signals generated when the engaged pins are pressed down through their individual linear actuators 812, or when pressure or strain is applied to the linear actuators 812 or support plate 810.

Figure 9A:
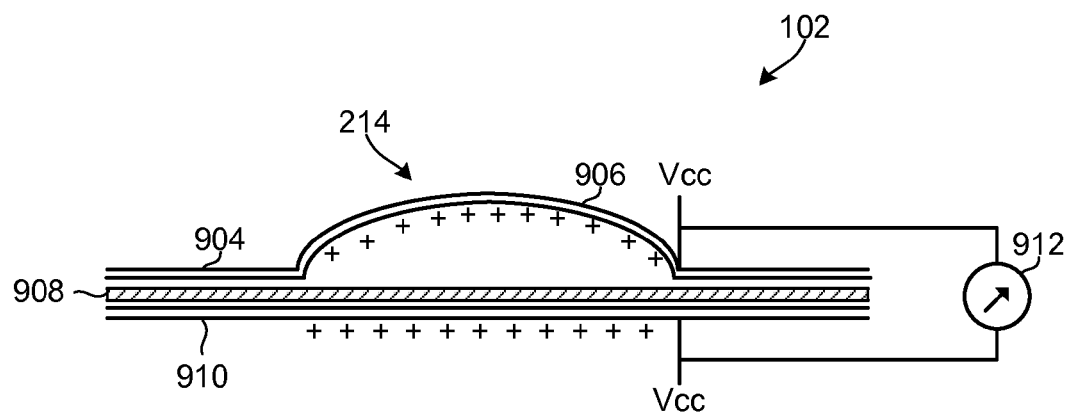
FIGS. 9A and 9B are cross-sectional views of an adaptive user interface actuated by applied voltages.
Figure 9B:
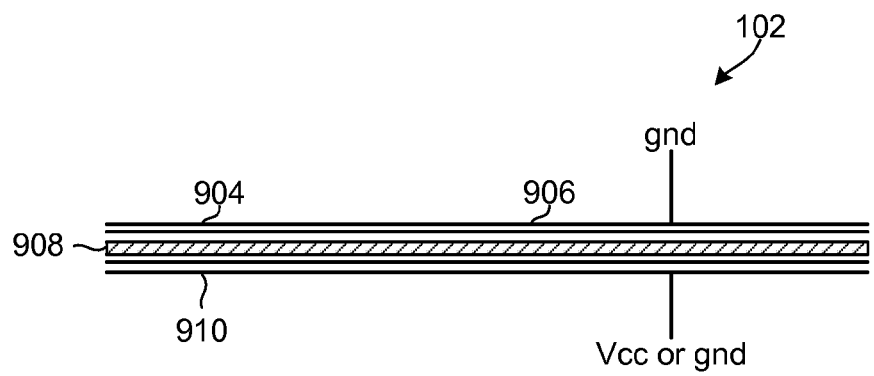

A further example shape changing actuation system utilizing electrostatic forces is illustrated in FIGS. 9A and 9B. In this example aspect, the adaptive user interface device 102 may include a top surface layer 904 and a bottom support layer 910 which may be selectively energized by a processor, such as applying a voltage (e.g., Vcc). If the top surface layer 904 and bottom support layer 910 are separated by an insulator layer 908, charges applied to the top and bottom layers may result in electrostatic repulsive or attractive forces. By configuring the top surface layer 904 with a pliable portion 906, when the voltages of the same polarity are applied to both the top surface layer 904 and bottom server support layer 910 as illustrated in FIG. 9A, the electrostatic forces may cause the pliable portion 906 to raise above the rest of the top surface layer 904. This raised surface may provide a tactile button 214. Pressing of this button 214 may be detected by the change in the capacitance or voltage between the two layers as may be measured by the electrical sensor 912. As illustrated in FIG. 9B, the button 214 may be retracted and the adaptive user interface device 100 may return to a smooth surface by coupling one or both of the top surface layer 904 and bottom support layer 910 to ground, or by applying voltages of opposite polarities to the top surface layer 904 and bottom support layer 910. By organizing the pliable portion 906 in an array, such as is illustrated in FIG. 8E, a wide variety of different button shapes can be generated.

Figure 9C:
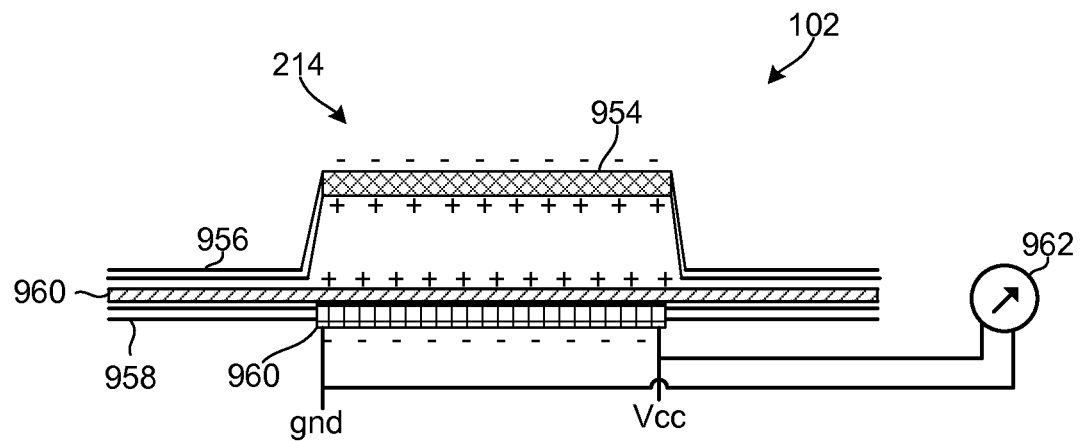
FIGS. 9C and 9D are cross-sectional views of an adaptive user interface actuated by applied magnetic fields.
Figure 9D:
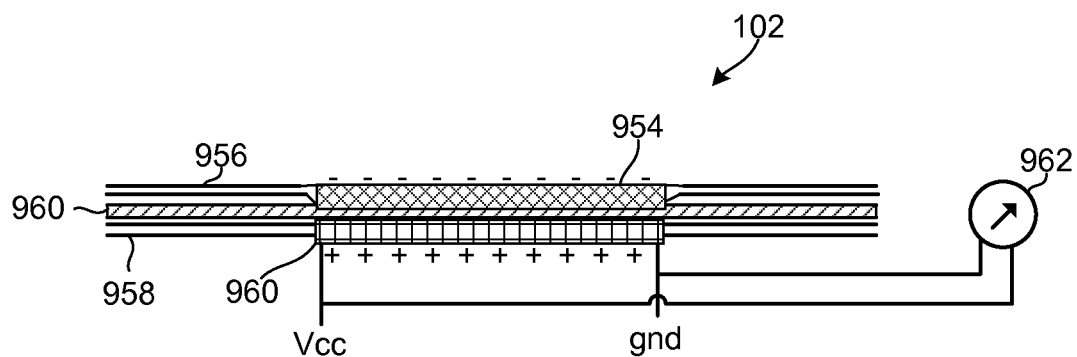

A further example of a shape changing actuation system utilizing magnetic forces is illustrated in FIGS. 9C and 9D. In this example aspect, the adaptive user interface device 102 may include permanent magnets 954 embedded within the pliable top surface layer 956 positioned opposite of pancake electromagnets 960 position within a bottom support plate 958. A separator layer 960 may be provided to prevent the permanent magnet 954 and electromagnet 960 from sticking together. By applying a voltage of the right polarity to the electromagnet 960, a magnetic field may be generated in a manner that repels the permanent magnet 954. If the permanent magnet 954 is coupled to the top surface layer 956 with pliable materials, it may raise above the surface layer to a sufficient degree so as to create a button 214 as illustrated in FIG. 9C. Actuation of this button may be detected such as by measuring a current induced in the pancake electromagnets 900 sixteenths, such as by an electrical sensor 962. By reversing the polarity of the current applied to the pancake electromagnet 960, an attractive force can be established between the permanent magnet 954 and the electromagnet 960, causing the permanent magnet 954 to rest on the separator layer 960 resulting in a smooth surface of the adaptive user interface device 102. By organizing the permanent magnet and electromagnet pairs in an array, such as illustrated in FIG. 8E, a wide variety of different button shapes can be generated by selectively energizing individual electromagnets 960.

In a further aspect, physical distortion of the surface of the interface may not be required. Instead, other techniques, such as vibrations, temperature or electric charges, may provide haptic feedback to users in control of regions of the user interface, such as applying force, creating vibrations, or changing temperature when input is received.

The controllability of the shape changing surface of an adaptive user interface device 102 can provide a large number of useful applications not available with currently known interface technologies. The ability to raise buttons of recognizable shapes anywhere on the adaptive user interface device surface may enable the interface to convey information regarding available command options (i.e., functions associated with the buttons) in a manner that is currently accomplished using visual displays. Raising buttons of recognizable shapes in different locations on the interface can communicate tactilely to the user the available button functions. Such buttons can then be pressed by a user to select the corresponding functions.

In a manner similar to how graphical user interfaces and voice-activated telephone interface systems operate, an aspect can raise buttons of shapes and locations that communicate their functionality in a menu tree organization. Thus, a series of different raised button configurations may be presented in response to user button presses, with the configuration changing depending upon the user inputs and the current functional options available. For example, a first configuration of raised buttons may enable the user to select among different classes of functionality (e.g., flight controls, engine controls, navigation controls, communication controls, etc.). Pressing one of such general menu buttons to select a class of functionality may lead to a second button configuration relevant to the selected class in which the button shapes and locations convey the functionality associated with each button. Pressing one of those buttons may actuate a corresponding function or select a further configuration of buttons associated with additional function options. Such layering of command options may continue through multiple layers in order to provide a wide range of functions that users can select via a single adaptive user interface device. Since the shape and location of buttons can change, a user can determine the function of a button based on feel without looking either at it or at a graphical user interface display. In this manner, a very sophisticated user control interface can be provided within a small interface surface area.

Conveying the functionality of a button in its shape and location may have a wide range of useful applications. One example application of such an adaptive user interface device is for control panels aircraft cockpits. Aircraft cockpits typically are filled with a multitude of buttons for controlling the various aircraft systems. Pilots must memorize the location of each switch or button, which take up large portions of the cockpit real estate. Recent avionics systems are replacing many buttons with a computer graphical user interface that can present menus identify functions assigned to fewer buttons. However, pilots much divert their attention to the display to activate a virtual key or button tied to a function identified on the display screen. The various aspects enable a different type of control system for use in cockpits in which many buttons can be replaced by a single adaptive user interface device that transforms the buttons presented to correspond with a multi-layered menu system of alternative functions.

In a further aspect, the adaptive user interface device may be configured with sensors to recognize the user based upon sensible parameters, such as the shape of the user's hand. Upon recognizing a user, the adaptive user interface device may change configuration and shape to provide the user with an interface consistent with the user's preferences and authorizations. Such capabilities may be combined with the transforming user interface to provide a further layer of security, since the keys will not be raised and made available for use if the user is not authorized. Further, the particular keys presented on the interface may depend upon the functionality that the user is authorized to activate.

Figure 10A:
FIGS. 10A through 10C are illustrations of a sequence of button configurations implemented on an adaptive user interface as a result of a sequence of button presses.
Figure 10B:
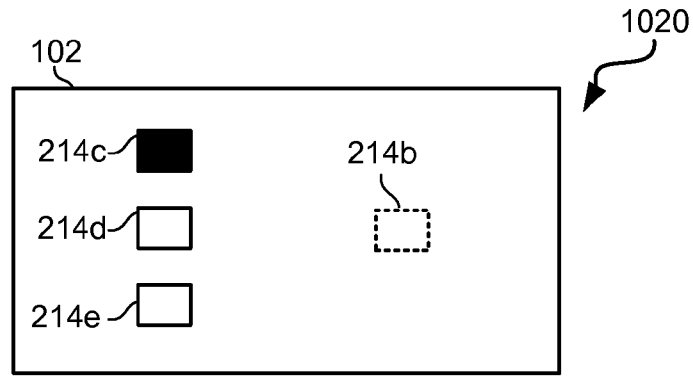
Figure 10C:
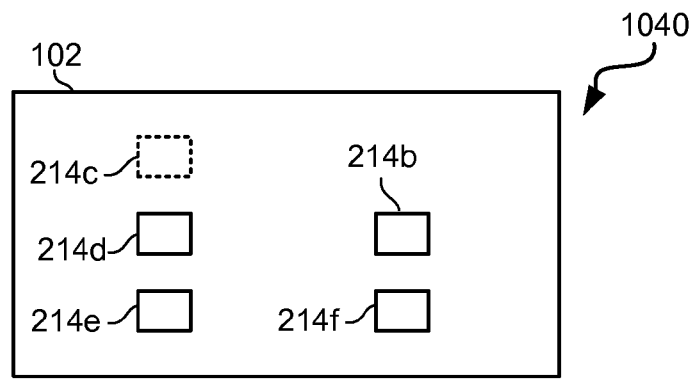

An example of an adaptive user interface device functioning to provide a menu of alternative keys based upon user inputs is illustrated in FIGS. 10A, 10B, and 10C. For example, FIG. 10A illustrates an adaptive user interface display 102 in which the user is presented with two function options represented by two raised buttons 214a, 214b. This may reflect an initial menu configuration 1000, in which the user can select between a second layer of menus. In response to the user pressing button 214b, a second interface configuration 1020 may be presented including buttons 214c, 214d and 214e, with button 214b having been withdrawn as illustrated in FIG. 10B. As a further example, if the user presses button 214c, the third alternative button configuration 1040 may be generated as illustrated in FIG. 10C including buttons 214b, 214d, 214e, and 214f, with button 214c withdrawn.

Figure 11A:
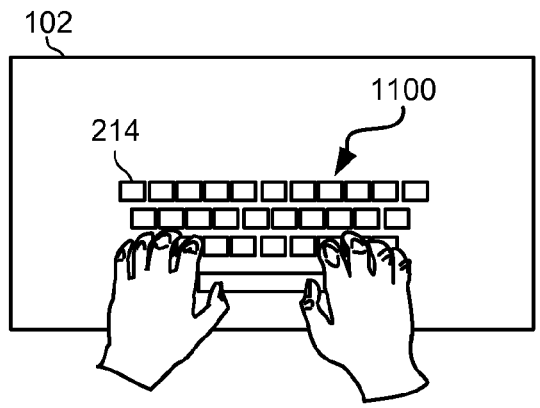
FIGS. 11A through 11C are illustrations of alternative keyboard configurations which may be presented on an adaptive user interface in response to recognized user characteristics.
Figure 11B:
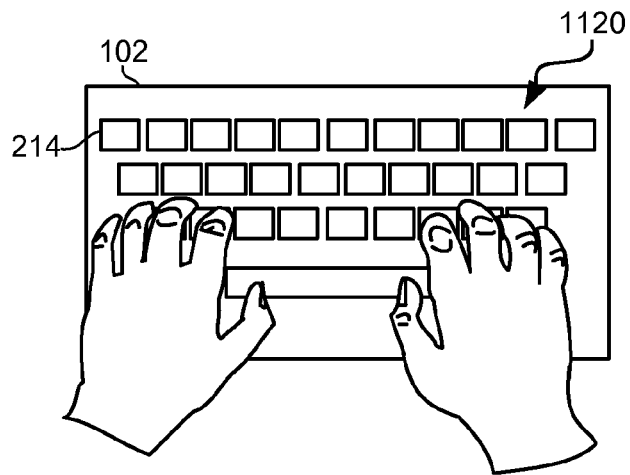
Figure 11C:
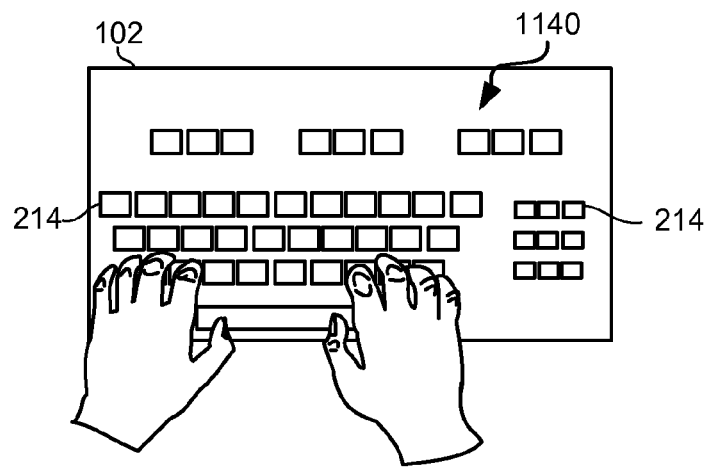

The capabilities of the various aspects may be useful in tailoring keyboards to a variety of different users, as illustrated in FIGS. 11A through 11C. For example, a young child may prefer a smaller keyboard, whereas an adult with large fingers may prefer larger keys that are more spread out. Thus, as illustrated in FIG. 11A, the adaptive user interface device 102 may transform into a keyboard 1100 suitable for a user with small hands, and transform into a larger key board configuration 1120 if the user has large-size hands as illustrated in FIG. 11B.

In a further example, user may select a particular type of keyboard layout, such as illustrated in FIG. 9C. Thus, a single adaptive user interface device 102 may enable users to select from a wide range of alternate keyboard arrangements, such as the Dvorak layout, and include a variety of keys for supporting various languages including additional keys for language specific diacritic marks. Each of these layouts may be set as preferred modes associated with a user identity or as different modes within the same aspect.

The physical configuration of the adaptive user interface device may be accomplished automatically, such as to adjust the topography of buttons to fit the size of a user's hand based upon their sensed touch locations on the surface, or they may be set by users. Users may program or set an adaptive user interface device to automatically react with a particular mode or topography based on the user's identity, such as in the form of personal preferences. For example, a user may prefer a keyboard layout including additional buttons as illustrated in FIG. 11C. When that particular user is identified to or recognized by the detected user interface device (or a computer coupled to the device), the user setting may be automatically implemented, resulting in keys rising in the desired locations.

Figure 12:
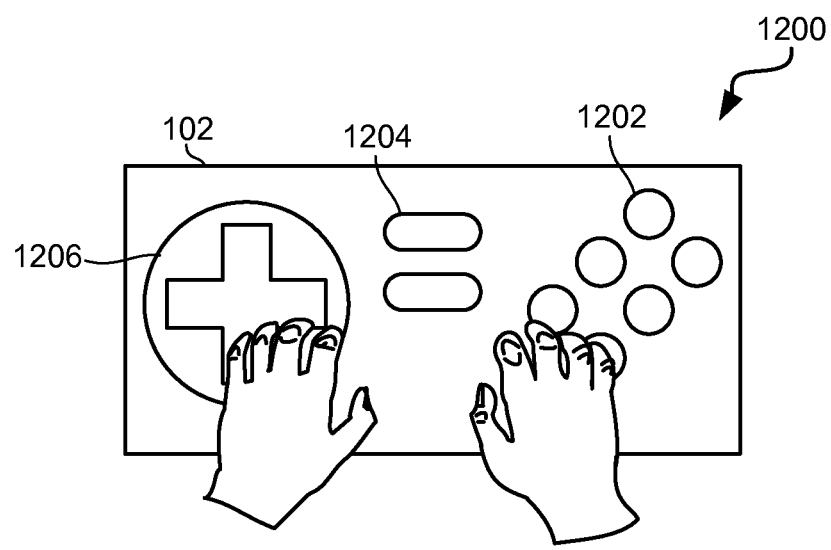
FIG. 12 is an illustration of an adaptive user interface configured as a computer game input.

The capabilities of the various aspects may not be limited to conventional keypad or keyboard layouts, and may accommodate a variety of user interface (it is appropriate to particular applications). For example, FIG. 12 illustrates a configuration 200 of an adaptive user interface device 102 in which the device has assumed a button topography specialized for computer games. For example, a game interface configuration 1200 may include a set of function control buttons 1202, a set of menu buttons 1204, and a motion or direction controller 1206. As an example of an application of an adaptive user interface device to a game application, a computing device may be configured to enable users to play a game with moving objects, similar to the game "Pong," by interacting with the surface to cause a raised portion to move about. For example, two players could sit on opposite sides of an adaptive user interface device surface and take turns hitting the raised portion of the surface with their hands. The touch of the user's hand on the raised portion of the surface would be detected by the adaptive user interface device to communicate to a processor which would cause the raised surface to move in response to the detected touch (e.g., location and pressure). Thus, the user touching a moving raised portion could cause that raised portion to travel in the opposite direction. A user might win such a game if the raised portion of the surface reaches a boundary of the adaptive user interface device. In a further example, a processor could cause the adaptive user interface device to raise portions of surface in order to propel an object, such as a ping-pong ball, poker chip or miniature toy, across the surface, such as in response to game inputs or games states. Other forms of physical interactions between moving surface portions and users may be implemented to enable a wide variety of computer games.

Figure 13:
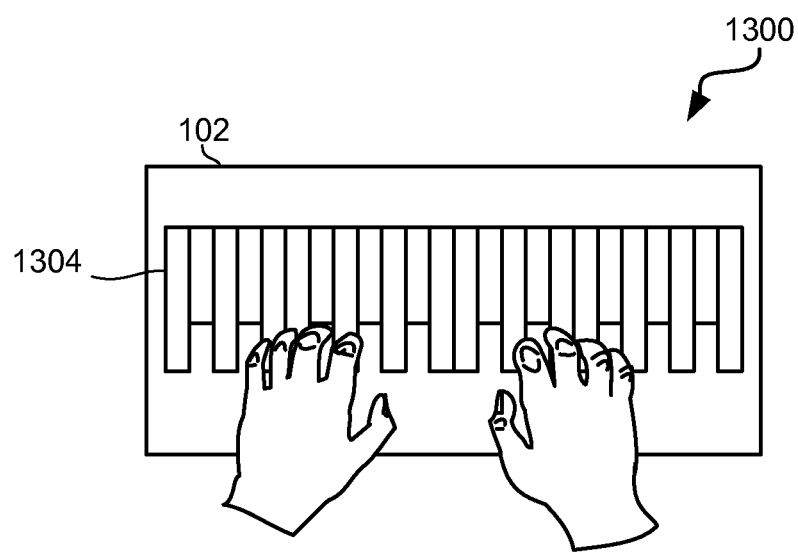
FIG. 13 is an illustration of an adaptive user interface configured as a musical keyboard.

FIG. 13 illustrates another example application in which the adaptive user interface device 102 has assumed a musical instrument configuration 1300 in which a plurality of piano keys 1304 are presented.

Figure 14:
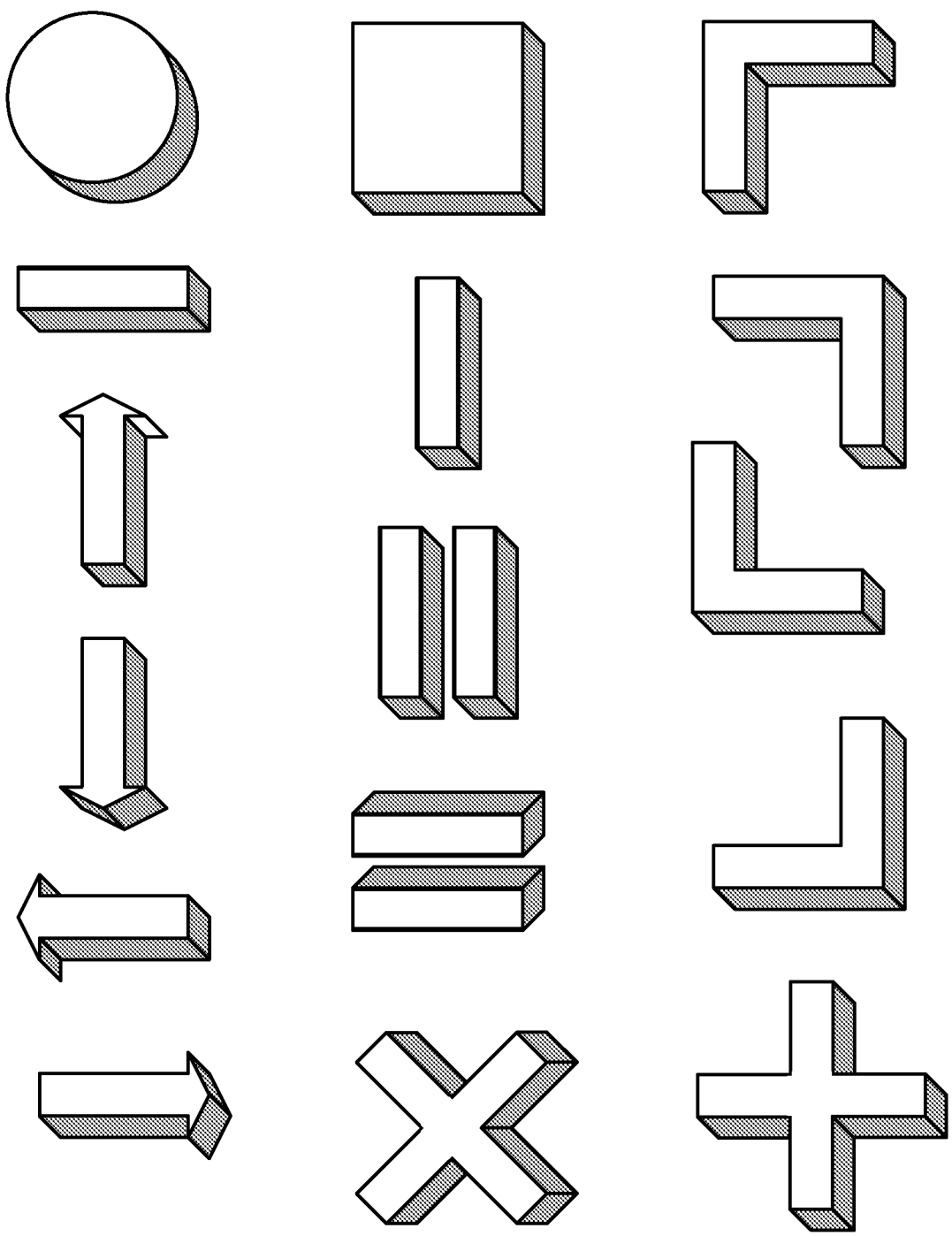
FIG. 14 shows examples of alternative button configurations which may be generated by an adaptive user interface.

As discussed above, the shape of buttons that are generated by the adaptive user interface display may be used to convey meaning to users that can be sensed without looking at the keypad. Examples of a few tactically recognizable button configurations are illustrated in FIG. 14. Other complex button shapes are also possible.

Various aspects are not limited to generating buttons. For example, complex topographies may be presented on the adaptive user interface device, such as to convey geographic information, identity information, and generally the kind of information that are currently communicated to users on visual displays. For example, the surface of an adaptive user interface device may morph into the contour of a person's face, enabling users to recognize an individual based on feel.

Figure 15A:
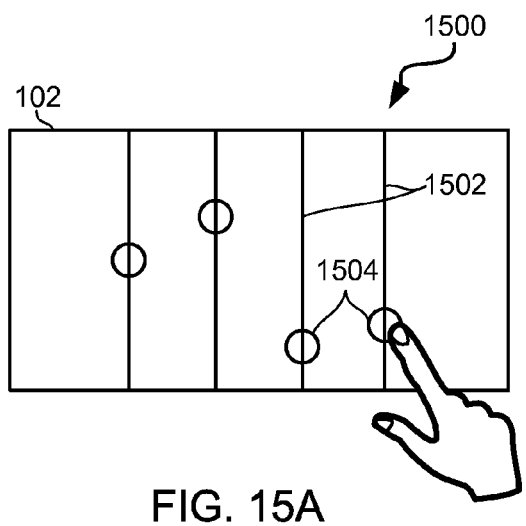
FIGS. 15A and 15B are illustrations of an adaptive user interface before and after a user interacts with the interface to slide a raised surface.
Figure 15B:
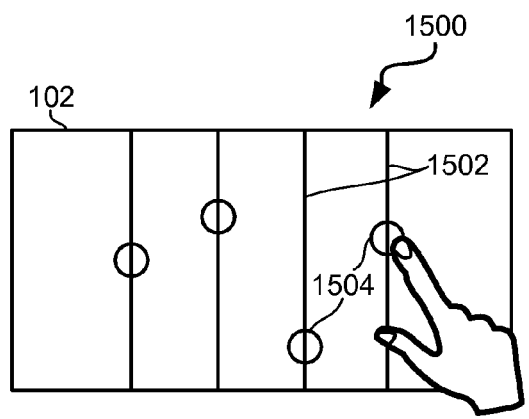

In further aspect, the position of buttons 214 presented on an adaptive user interface display may change in response to user inputs. For example, FIGS. 15A and 15B illustrate a configuration 1500 in which buttons 1504 are positioned along the raised lines 1502, such as in a manner similar to how letters may be positioned in an audio equalizer, a sliding electronic control or a linear potentiometer. FIG. 15A illustrates a first position of interface buttons 1504. The user may touch one of the buttons and without lifting a finger from the surface, push it vertically along one of control lines 1502. In response to sensing the applied pressures, the adaptive user interface device may reposition the buttons along the vertical axis MDII as if the user were physically moving a button. FIG. 15B illustrates a second position of the interface buttons 1504 after the user has moved one of the buttons along one of the vertical lines 1502. This form of control provides both visual and tactile feedback regarding the position of the buttons along the vertical scale, such as may be useful for controlling systems that respond to such a linear inputs. The sliding motion of the generated button may signal any input with a continuous range of values including behavior similar to the sliding electronic control or linear potentiometers that the surfaces resemble.

Figure 16A:
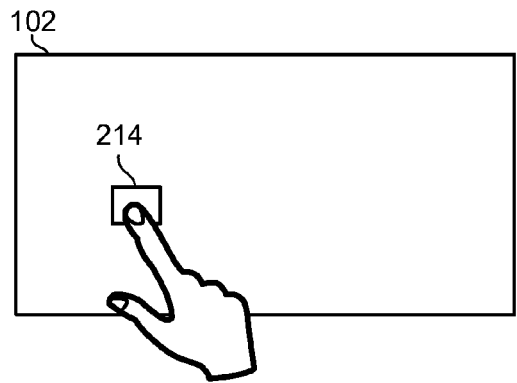
FIGS. 16A and 16B are illustrations of an adaptive user interface before and after a user interacts with the interface to manipulate the topography of an input mode.
Figure 16B:
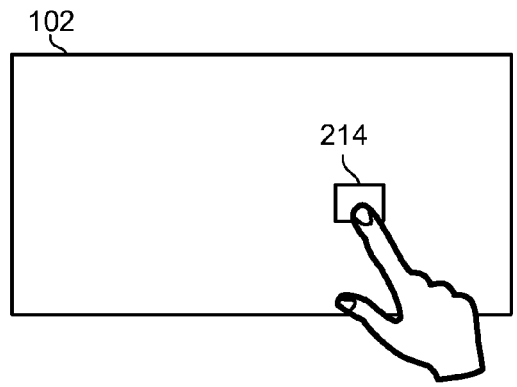

In a similar manner, users may reposition buttons on the adaptive user interface device, such as to suit their personal preferences or working needs. For example, as illustrated in FIG. 16A, a user may touch a button 214 in one position and drag it to a second position where it may remain as illustrated in FIG. 16B. In addition to input, sliding surfaces may also be a way of manipulating an aspect into a preferred topography. Such personalized topographies may be saved as user preferences that may then be reproduced when the user's identity is made known to the adaptive user interface device or an attached computing device.

Figure 17:
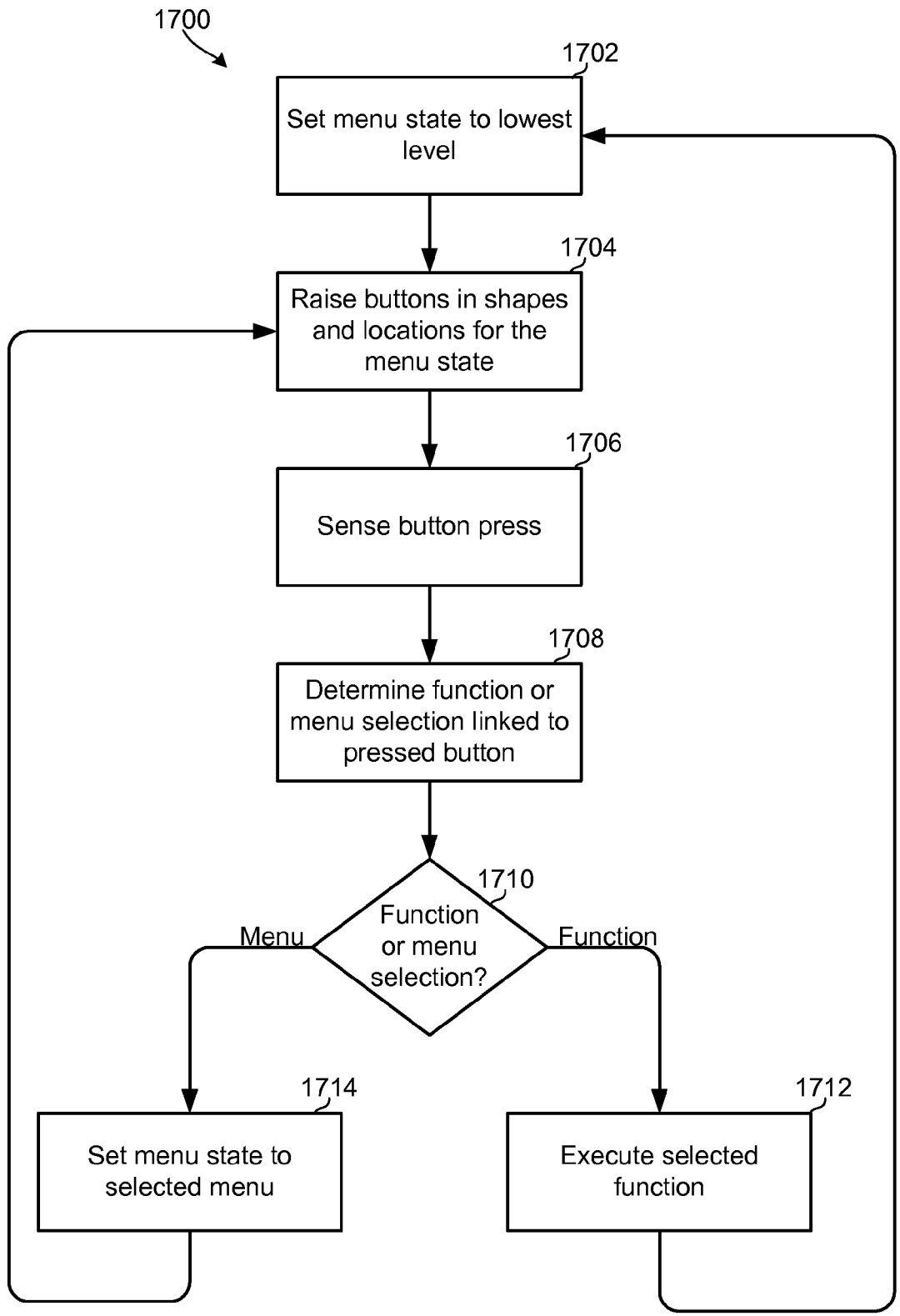
FIG. 17 is a process flow diagram of a method for presenting a variety of button configurations in a menu tree according to an aspect.

As discussed above, the flexibility of presenting buttons in various locations and various shapes enables a neat new form of interface with users not tied to visual displays. An example method 1700 that may be implemented in a computing device or within an adaptive user interface device equipped with a processor for implementing a variety of menu button configurations is illustrated in FIG. 17. In method 1700 in block 1702, a processor may set the menu state at the lowest level in a layered menu organization. For example, the lowest layer level menu may provide options for selecting categories of menus from which the user can select. In block 1704, the adaptive user interface device may raise the buttons in the shapes and locations corresponding to the currently set menu state. In block 1706, the adaptive user interface device may sense a button press, and in block 1708, an attached processor may determine the function or menu selection that linked to the pressed button. In blocks 1706 and 1708, the linked functionality may be determined based upon a map of functions correlated to button locations on the surface area of the adaptive user interface device defined in the current menu state. Thus, determining the function or menu selection options linked to particular buttons may involve correlating the location of the button press to options presented in the current menu state. In determination block 1710, the processor may determine whether the selection indicated by the button press has selected an executable function or another menu. If the functionality corresponding to the button press is a selection of another menu to be implemented (i.e., determination block 1710="Menu selection"), the processor may set the menu state to the selected menu in block 1714. Thereafter, the adaptive user interface device may return to block 1704 to raise buttons in shapes and locations corresponding to the newly selected menu state. If the processor determines that the pressed button corresponds to an executable function (i.e., determination block 1710="Function"), the selected function may be executed in block 1712. If, as a result of executing the function, the menu options should return to the base menu, the processor may return to block 1702 to set the menu state at the lowest level. If the executed function results in a different menu state, the processor may optionally return to block 1704 to implement the current menu state.

The menu states defined and implemented in method 1700 may be specified in user applications and/or within a computing device operating system. For example, many states may specify the physical location on the interface and shape of buttons, along with their associated functionality organized in terms of menu states. Any number of menu states may be so defined by application developers. Thus, method 1700 enables application developers to implement a wide variety of physical keypad configurations and menus.

While some of the figures illustrate the adaptive user interface device configured as a flat surface, such as a tablet surface, the interface surfaces may be configured in any form or contour and positioned on any accessible surface of a computing device or apparatus coupled to a computing device. For example, as mentioned above, the adaptive user interface device may be incorporated into surfaces of an aircraft cockpit or an automobile dashboard or console. As another example, adaptive user interface device elements may be incorporated on any surface of a mobile device (e.g., a smart phone, smart book, or laptop), such as a side or the back surface. In this manner, for example, a user interface set of buttons may be activated and raised on the back of a mobile device enabling the user to provide inputs by pressing buttons of recognizable shapes on the back surface while viewing images on the visual display on the front surface.

Although the adaptive user interface device enables users to interact with a system without a graphical display, in some aspects the interface may also incorporate display elements. In addition to the raised button configuration communicating the state of the system, flexible display elements may be integrated into the top layer of the adaptable user interface device which can be controlled by a processor to convey visual information. An example of a suitable display technology that may be used for this aspect is flexible organic light emitting diode (OLED) technology, an example of which has recently been announced by Sony Corporation. Displaying visual information on top of morphing surfaces may confirm the functions of the raised buttons, such as displaying letters, numbers, and/or colors on the raised surface. In this way the actuated buttons may be dynamically labeled with a visual identifier such as a color, letter or number, and/or text label. This aspect of an adaptive user interface device equipped with a dynamic display is illustrated in FIGS. 18A-18C.

Figure 18A:
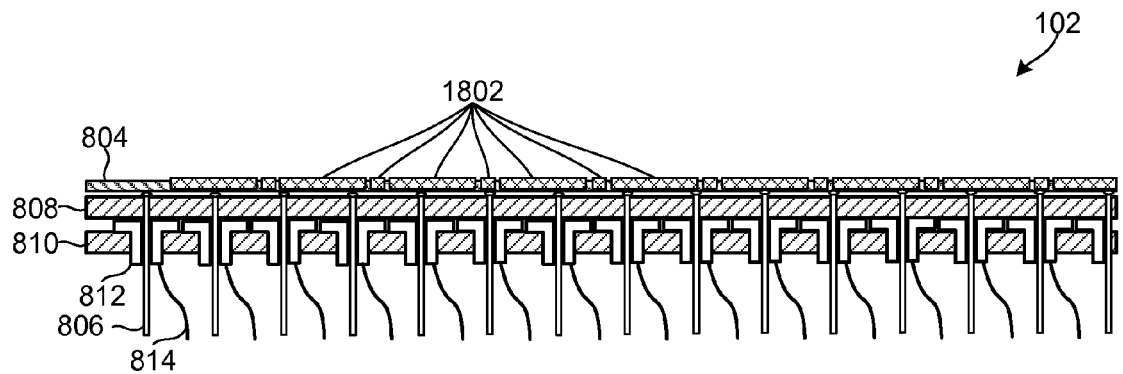
FIGS. 18A-18C cross-sectional and elevation views of an aspect adaptive user interface configured with visual display elements.
Figure 18B:
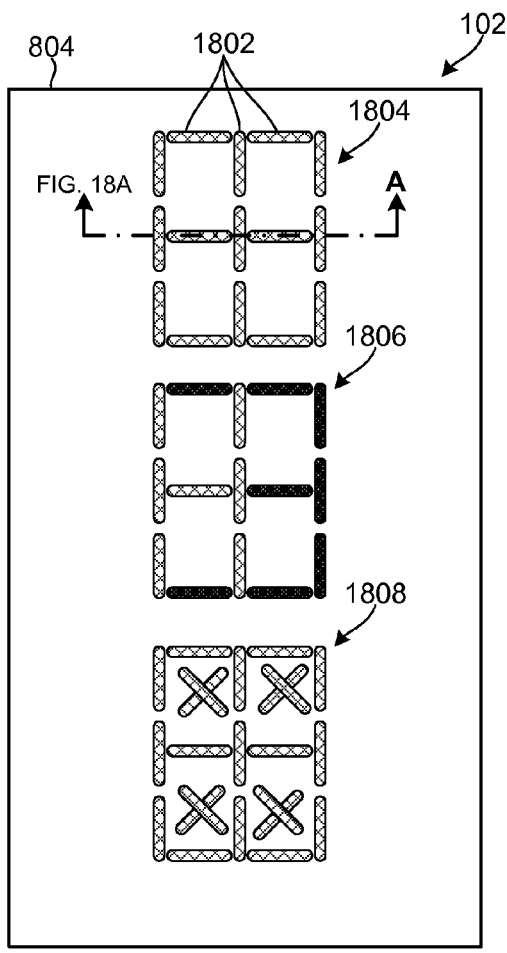
Figure 18C:
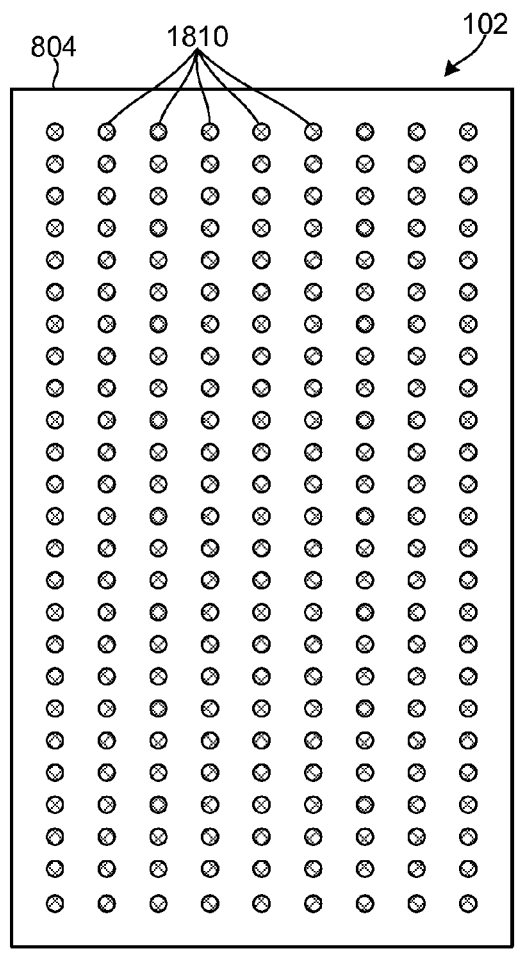

Referring to FIG. 18A, an adaptive user-interface device 102 with integrated visual display elements may be formed by including processor-activated display elements 1802, such as flexible OLED elements, within or on top of the top surface 804. The display elements 1802 may be flexible in structure so they can bend with the top surface 804 when various configurations of raised buttons or shapes are activated. The display elements 1802 may be arranged in a variety of shapes and layouts in order to accommodate a wide assortment of deployable buttons and shapes. A variety of display element components may be implemented in the various aspects, including, for example, liquid crystal display (LCD) elements and light emitting diodes (LED) of the various types. Other components illustrated in FIG. 18A are described above with reference to FIG. 8.

In some aspects, the processor-activated display elements 1802 may be configured as set display features, such as letters, numbers or text for underlying buttons which are illuminated or otherwise activated when the underlying button is raised. In this manner, the keys of a keyboard are identified when the keyboard mode is activated (i.e., when the keys are raised and configured to receive user inputs), but not illuminated when the adaptive user-interface device 102 is in a table or deactivated mode.

In other aspects, the processor-activated display elements 1802 may be positioned on the adaptive user interface display device 102 so that they can be activated by a processor in order to generate any display consistent with the element patterns. For example, referring to FIG. 18B, the processor-activated display elements 1802 may be positioned on the adaptive user interface display device 102 in segments and patterns so that any number or character may be illuminated by the processor selectively darkening (e.g., by activating an LCD) or illuminating (e.g. energizing an LED) particular display element segments. In this aspect, the display elements 1802 may be in the form of short strips which are configured in an array formatting a number/character pattern 1804. As illustrated in cross-section A that is shown in FIG. 18A, the display elements 1802 may be partially or fully embedded within the external surface 804. By selectively activating specific display elements 1802, the processor can generate any number or character within the number/character pattern as illustrated in number/character pattern 1806. A wide variety of different display element 1802 patterns may be implemented, such as providing diagonal display elements as illustrated in number/character pattern 1808. In this aspect, each of the display elements 1802 are coupled electronically to the processor so that they may be selectively energized to illuminate the letter or character corresponding to an activated button.

In another example illustrated in FIG. 18C, the processor-activated display elements 1802 may be configured as an array of dots or LEDs across the surface of the adaptive user-interface display device 102. In this configuration, any form of display may be generated by selectively illuminating or darkening selected display elements 1802 in order to form a pattern. This aspect may be particularly useful for adaptive user interface displays that can activate a wide range of buttons and raised shapes since any pattern of letters, numbers, shapes or text may be illuminated or darkened on the surface. While FIG. 18C shows a pattern of round dots, the display elements 1802 may be of any shape, including linear segments, crosses, ovals, etc.

In use, a processor coupled to the adaptive user-interface display device 102 may activate display elements 1802 in conjunction with activating buttons or raised portions of the device surface, such as part of the operations performed in blocks 512 and 1704 described above with respect to FIGS. 5 and 17. In this manner, the shape and location of the raised buttons may depend upon or convey the meaning of their functionality, which may be expressed in a visual display on the surface of the buttons/raise portions.

In a further aspect, an application programming interface (API) may be provided to assist application developers in configuring and implementing an adaptive user interface device. For an adaptive user interface device capable of actuating any portion of a surface, such as described above with reference to FIGS. 8A-8E, the individual surface actuators may be treated in a manner like display pixels, with the exception that the actuation involves specifying a height to which the surface should be elevated. To reflect this, the smallest actuation element units may by referred to as "hixels."

There are several ways that a C programmer could configure an application to actuate collections of hixels so as to generate a particular user interface surface configuration. In a first example, applications could be configured to draw into some location or buffer in memory, which might be called a "Height Canvas". The adaptive user interface device may then use the data stored in such a Height Canvas to determine which hixels to raise and how high. The adaptive user interface device then raises or lowers each hixel (or set of pixels if the device does not have pixel-to-hixel resolution). For example, hixels with value of 0 (black) may not be raised, while hixels with a value of 255 (white) may be extended to their maximum height. By sequentially loading new hixel values into the Height Canvas the adaptive user interface device may be cause to move or animate, with surface features the rising and falling with time.

In a second example, a function or API could be provided by the manufacturer of the adaptive user interface device that can be called by any application program to actuate hixels. Such a function or API could receive an image from a graphics buffer, such as some or all of a displayed image, transform the received image into grayscale, possibly modify the image to render it suitable for use in actuating particular surface actuation elements, and copy the result into a Height Canvas as described above. In this manner, an animated image processed by such a function or API could generate a moving surface features.

In a third example, graphical user interface (GUI) toolkits, like Qt, GTK, or Windows, may be modified to provide a look up table whereby for every widget (buttons, checkbox, slider, etc) that can associate interface features with hixels of particular positions and heights. Thus, if a developer is using Visual C++ to drag and drop buttons to create a calculator application, a GUI toolkit, like Microsoft, may determine the height of buttons on the calculator interface should be of hixel value 128 with the buttons configured to be round, and determine that the height of text boxes should be of hixel value 96 around the border, with the text having a hixel value of 48. Such GUI toolkits could work with a wide array of software applications and programming languages, and be used to support application development for a variety computing devices.

In a further aspect, the height to which buttons and features are raised in the may be adjustable or user-definable, such as adjusted according to a scale factor based on user preferences, measurements of the user's hand and/or fingers, or other information. Such an actuation height adjustment scale factor for particular users may be recorded in memory, so that the height of actuated buttons and surfaces will depend upon who his logged into the system. Such an actuation height adjustment scale factor may be applied to hixel values store in a height canvas, or may be applied to inputs that are used to populate the height canvas.

In a further aspect, the processor of the computing device may control and adaptable user interface device in a manner that interacts with the user by moving the raised surfaces in response to the user or based on operations or operational states of an executing application. Thus, the computing device processor and the adaptive user interface device may be configured to raise a portion of the device surface to alert the user to a condition, such as an incoming telephone call, an alarm, or a current or pending operating state. For example, the adaptive user interface device could be used by a processor to touch, tap or poke the user (such as the user's leg when the computing device is in the user's pocket) to alert the user to an incoming telephone call, email or text message. Such a touch, tap or poke could take the place of or augment a vibration mode alarm. As another example, a portion of the interface surface could be raised up to provide a visual indication of the alarm, such as to simulate raising a hand or a flag.

As another example, the computing device processor and the adaptive user interface device may be configured to determine whether a current position of a user's hand on the device surface is suitable for a current operating state, and, when it is not in an suitable position, raise portions of the surface so as to guide the user's hand to a better location.

Figure 19:
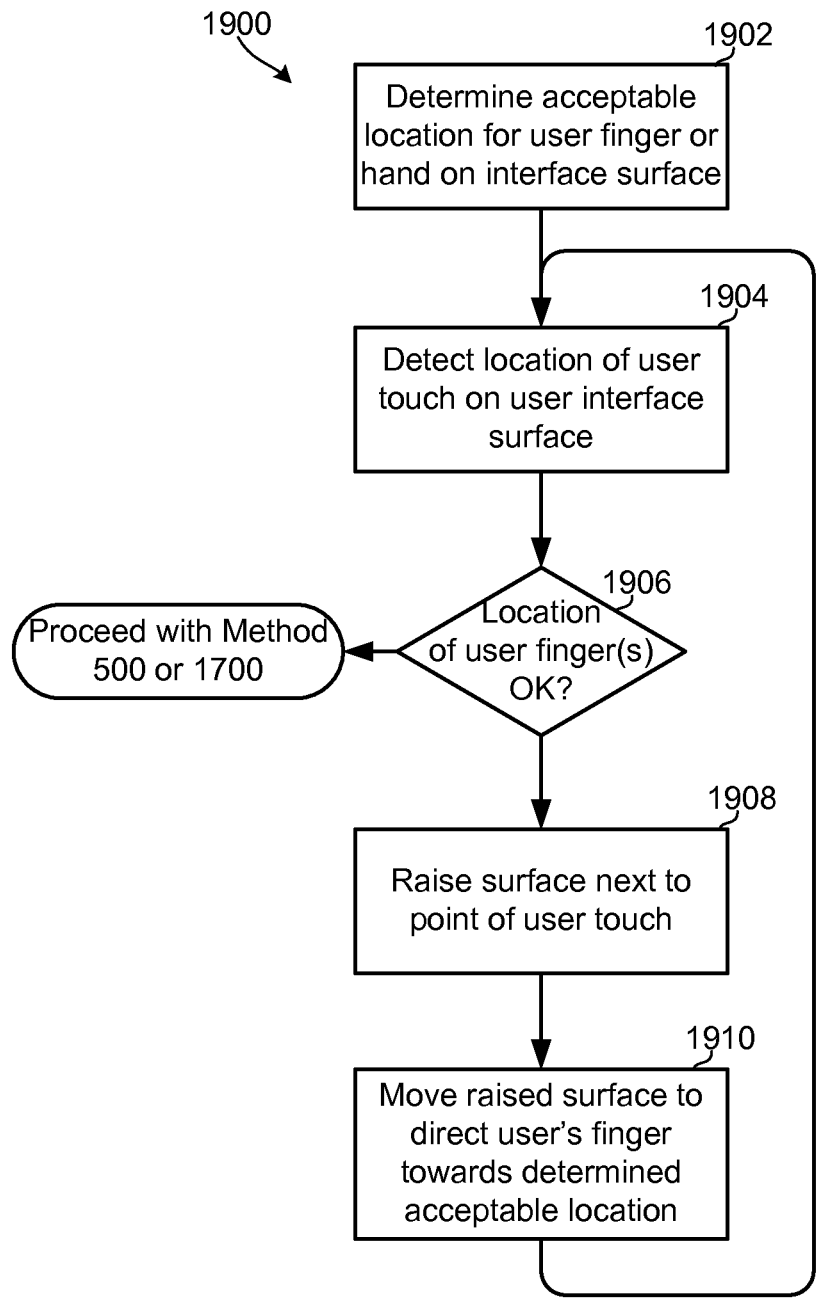
FIG. 19 is a process flow diagram of a method for interacting with a user to suggest a new position for a user's finger on the interface device according to an aspect.

A method 1900 for guiding a user's finger to a new location is illustrated in FIG. 19. In method 1900 in block 1902, the processor may determine an acceptable location for the user's finger or hand. This determined acceptable position may depend upon a configuration of buttons the actuated for current operating state or application, or a displayed image that would otherwise be blocked by the user's hand. In block 1904, the adaptive user interface device may detect the touch of a user's finger on the interface surface and communicate the location of the touch to the processor of a computing device coupled to the user interface device. In determination block 1906, the processor may determine whether the user's finger or hand is in an acceptable position on the surface of the adaptive user interface device. For example, if the adaptive user interface device includes a display element, as described above with reference to FIGS. 18A-18C, the processor may determine whether the position of the user's finger on the adaptive user interface device surface would block the user's view of an important part of the display. As another example, the processor may determine that the user's hand in an unsuitable position when a current operating state of the device requires a raised button configuration that cannot be sensed or actuated by a user when the user's hand is in the determined position. If the processor determines that the user's fingers or hand are in an acceptable location on the user interface surface (i.e., determination block 1906 ="Yes"), the processor and adaptive user interface device may proceed with method 500 or 1700 as described above with reference to FIG. 5 or FIG. 17.

If the processor determines that the user's finger or hand is not in an acceptable location (i.e., determination block 1906="No"), the processor may direct the adaptive user interface device to raise a portion of the actuator surface that is connected to the location of the user's finger or hand in block 1908. In block 1910, the processor device may then actuate adjoining surface actuator elements in order to move the raised surface so as to direct the user's finger towards the determined acceptable location. For example, the actuator surface may provide a ridge or raised surface that presses against the tip of the user's finger so as to provide a simple push in the direction of the acceptable location. With each incremental movement of the raised surface, the processor may determine whether the user's finger or hand has moved to the acceptable location by returning to block 1904 to determine its current position on the surface. This movement of a portion of the surface may continue until the processor determines that the user's finger or hand are in an acceptable location on the user interface surface (i.e., determination block 1906="Yes"), the processor and adaptive user interface device may proceed with method 500 or 1700 as described above with reference to FIG. 5 or FIG. 17. In this manner, the computing device and associated adaptive user interface device can provide haptic feedback to the user to guide the user's finger or hand to a more suitable location on the device surface.

Along the lines of prompting a user to move fingers to a more suitable location, a processor of the computing device may also be configured to similarly move a user's finger to a location that may improve operation, such as by providing an additional heat sink. For example, the processor may be configured to detect when the device is running above a threshold temperature, and raise portions of the actuator surface so as to reposition one or more of the user's fingers to a location where it can serve as an additional heat sink.

In a further aspect, a processor of a computing device may be configured to use the ability to move raised portions of the adaptive user interface device to generate movement of the computing device itself. For example, the processor may be configured to move raised portions across the interface surface that enables the device to walk across a table or other surface. In another example, the processor may be configured to move raised portions across the interface surface to cause the device to crawl within a user's pocket. For example, the processor may be configured to recognize when the devices in a user's pocket (e.g., by detecting low or no ambient light, the device being in a sleep mode, the device being in a vertical orientation, etc.), and activate the movable membrane in a manner consonant to crawl deeper into the user's pocket (i.e., in the direction of gravity) in order to prevent the device from falling out of the pocket.

In a further aspect, the adaptive user interface display configuring with actuator elements that enable a large actuation could be configured to pop open a cover of the surface, such as to alert the user to a condition requiring a user input. Such an actuation may be configured as an alarm condition or actuation that may be activated by an application.

Figure 20:
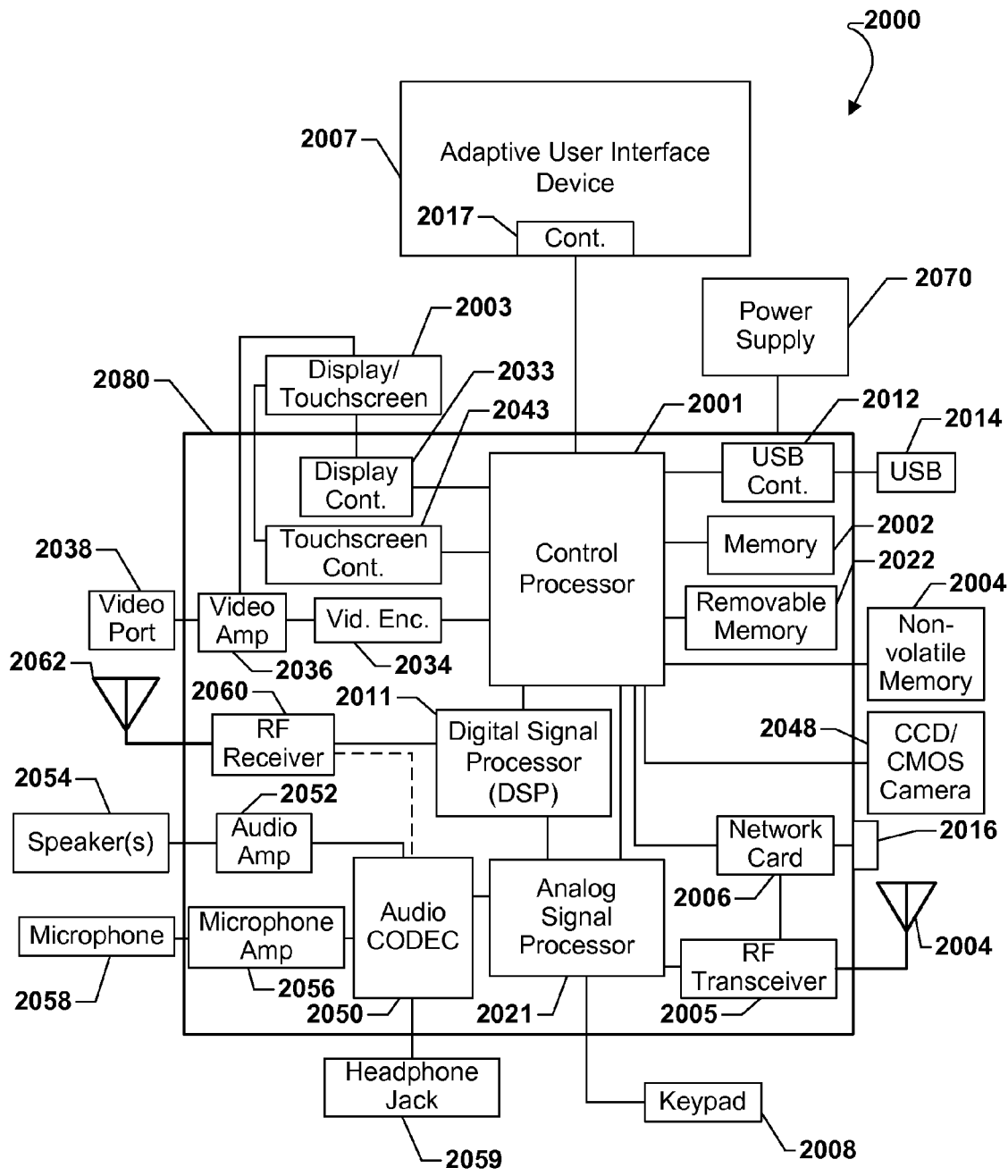
FIG. 20 is a component block diagram of a computing system suitable for use with the various aspects.

The aspects described above may be implemented on any of a variety of computing devices, example components of which are illustrated in FIG. 20. Example components and modules of an exemplary, non-limiting aspect of a computing device 2000 is illustrated in FIG. 20. A computing device 2000 may include circuit board 2080 of electronic components (e.g., a motherboard), some or all of which may be integrated into an on-chip system, that includes a control processor 2001 coupled to memory 2002. The control processor 2001 may further be coupled to a digital signal processor 2011 and/or an analog signal processor 2021, which also be coupled together. In some aspects, the control processor 2001 and a digital signal processor 2011 may be the same component or may be integrated into the same processor chip. A display controller 2033 and a touchscreen controller 2043 may be coupled to the control processor 2001 and to display or touchscreen display 2003 within or connected to the computing device 2000.

In the various aspects, the control processor 2001 may be coupled to an adaptive user interface device 2007. In some aspects, the adaptive user interface device 2007 may be integrated within the computing device 2000 structure, such as a portion of the device exterior surfaces, while in others the adaptive user interface device 2007 may be a separate device, such as a digital tablet/touch pad or machine control interface. In some aspects, the adaptive user interface device 2007 may include a controller circuit 2017 that may function as a control interface between the actuators and sensors of the adaptive user interface device and the control processor 2001. In other aspects, the controller circuit 2017 may be included within the computing device components, such as on the motherboard 2080, or even within the control processor 2001. In some aspects, the controller circuit 2017 may include a processor (not shown separately) to control operations performed by the adaptive user interface device 2007 in response to control signals from the control processor 2001 and/or in response to user interactions with the device.

Additionally, the control processor 2001 may also be coupled to removable memory 2022 (e.g., an SD memory or SIM card in the case of mobile computing devices) and/or to external memory 2004, such as one or more of a disk drive, CD drive, and a DVD drive. The control processor 2001 may also be coupled to a Universal Serial Bus (USB) controller 2012 which couples to a USB port 2014. Also, a power supply 2070 may be coupled to the circuit board 2002 through the USB controller 2012 or through different electrical connections to provide power (e.g., DC power) to the various electronic components.

The control processor 2001 may also be coupled to a video encoder 2034, e.g., a phase alternating line (PAL) encoder, a sequential couleur a memoire (SECAM) encoder, or a national television system(s) committee (NTSC) encoder. Further, the video encoder 2034 may be coupled to a video amplifier 2036 which may be coupled to the video encoder 2034 and the display or touchscreen display 2003. Also, a video port 2038 may be coupled to the video amplifier 2036 to enable connecting the computing device 2000 to an external monitor, television or other display (not shown).

In some aspects, particularly mobile computing devices, the control processor 2001 may be coupled to a radio frequency (RF) transceiver 2005, such as via an analog signal processor 2021. The RF transceiver 2005 may be coupled to an RF antenna 2004 for transmitting and receiving RF signals. The RF transceiver 2005 may be configured to transmit and receive communication signals of one or more different wireless communication protocols including, for example, cellular telephone (e.g., G-3, UMTS, CDMA, etc.), WiFi, WiMax, and BlueTooth.

The control processor 2001 may further be coupled to a network card 2006 which may be coupled to a network connector 2016 and/or the RF transceiver 2005 and configured to enable communications via an external network (e.g., local area networks, the Internet, an intranet, WiFi networks, Blue-Tooth networks, personal area network (PAN) etc.) The network card 2006 may be in the form of a separate chip or card, or may be implemented as part of the control processor 2001 or the RF transceiver 2005 (or both) as a full solution communication chip.

A number of analog devices may be coupled to the control processor 2001 via the analog signal processor 2021, such as a keypad 2008 as shown in FIG. 20. In other implementations, a keypad or keyboard may include its own processor so that the interface with the control processor 2001 may be via direct connection (not shown), via a network connection (e.g., via the network card), or via the USB port 2014.

In some implementations, a digital camera 2048 may be coupled to the control processor 2001. In an exemplary aspect, the digital camera 2048 may be a charge-coupled device (CCD) camera or a complementary metal-oxide semiconductor (CMOS) camera. The digital camera 2048 may be built into the computing device 2000 or coupled to the device by an external cable.

In some implementations, an audio CODEC 2050 (e.g., a stereo CODEC) may be coupled to the analog signal processor 2021 and configured to send sound signals to one or more speakers 2054 via an audio amplifier 2052. The audio CODEC 2050 may also be coupled to a microphone amplifier 2056 which may be coupled to a microphone 2058 (e.g., via a microphone jack). A headphone jack 2059 may also be coupled to the audio CODEC 2050 for outputting audio to headphones.

In some implementations, the computing device 2000 may include a separate RF receiver circuit 2060 which may be coupled to an antenna 2062 for receiving broadcast wireless communication signals. The receiver circuit 2060 may be configured to receive broadcast television signals (e.g., FLO TV broadcasts), and provide received signals to the DSP 2011 for processing. In some implementations, the receiver circuit 2060 may be configured to receive FM radio signals, in which case the received signals may be passed to the Audio CODEC 2050 for processing.

In an aspect, processor-executable instructions for accomplishing one or more of the method operations described above may be stored in the internal memory 2002, removable memory 2022 and/or non-volatile memory 2004 (e.g., as on a hard drive, CD drive, or other storage accessible via a network). Such processor-executable instructions may be executed by the control processor 2001 in order to perform the methods described herein.

Figure 21:
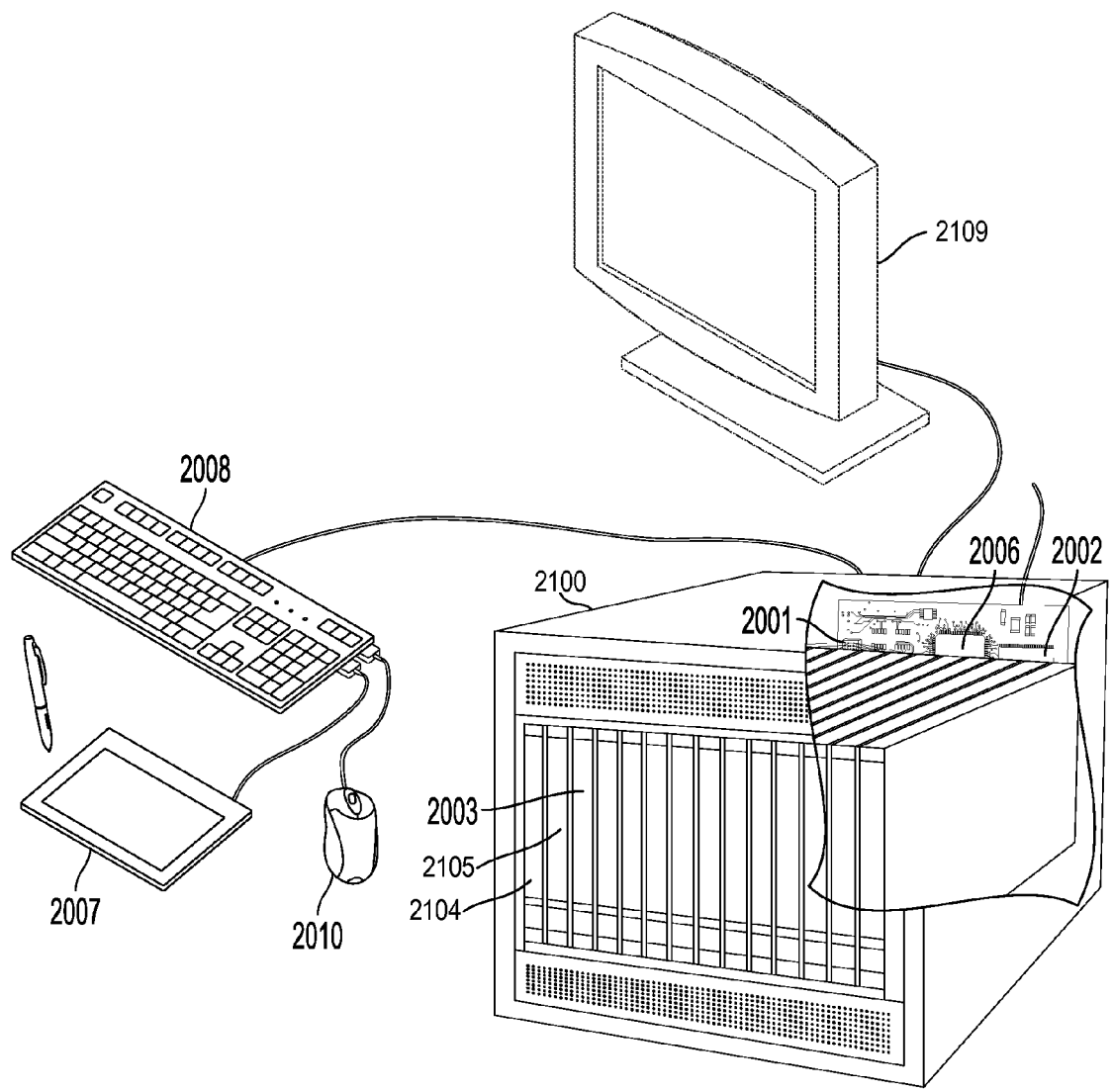
FIG. 21 is an illustration of a computer suitable for use with the various aspects.

An example of a multipurpose computer 2100 suitable for use with the various aspects is illustrated in FIG. 21. Such a multipurpose computer 2000 typically includes a processor 2001 coupled to volatile memory 2002 and a large capacity nonvolatile memory, such as a disk drive 2003. The computer 2100 may also include a floppy disc drive 2104 and a compact disc (CD) drive 2105 coupled to the processor 2001. In the aspects the computer 2000 is coupled to an adaptive user interface device 2007, such as described above. Additionally, computer 2100 may also be coupled to conventional user interface devices, such as a keyboard 2008, computer mouse 2010 and a display 2109. The computer 2100 may also include a number of connector ports coupled to the processor 2001 for establishing data connections or receiving external memory devices, such as a USB or FireWire® connector sockets or other network connection circuits 2006 for coupling the processor 2001 to a network.

Figure 22:
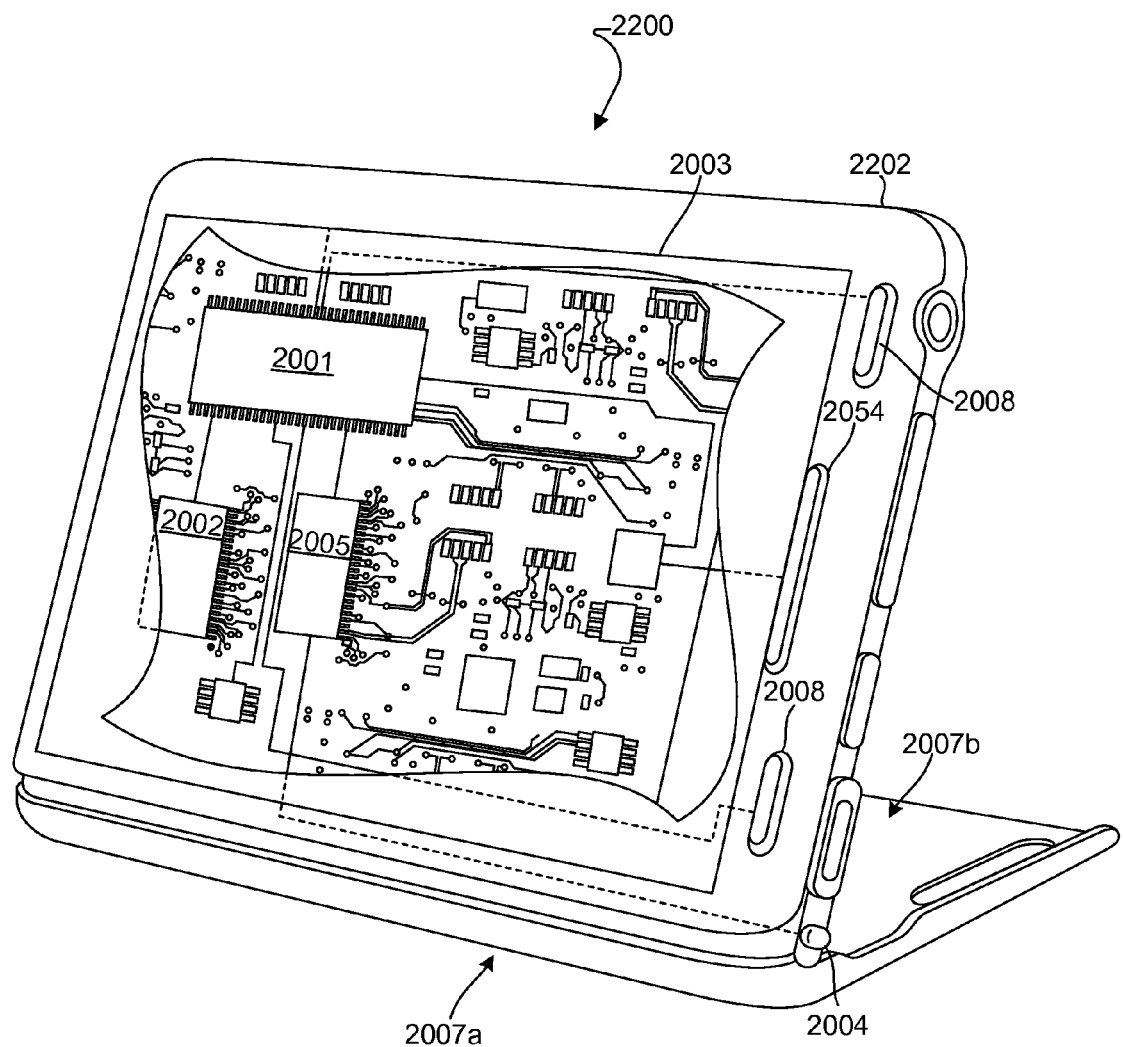
FIG. 22 is an illustration of a mobile device suitable for use with the various aspects.

An example of a mobile device 2200 suitable for use with the various aspects is illustrated in FIG. 22. Such a mobile device 2200 may include the components described above with reference to FIG. 20 within the case 2202 of the device as illustrated. Additionally, one or more of the surfaces of the mobile device 2200 may be configured as an adaptive user interface device 2007. For example, a back portion of the case 2202 may include an adaptive user interface device 2007a. So configured, user inputs may be provided on both a back side adaptive user interface device 2007a and a touchscreen display 2003. Additionally or alternatively, a normal user interface portion may be configured with an adaptive user interface device 2007b, such as a portion of the device where a keyboard might otherwise be provided as illustrated. In the example illustrated in FIG. 22, an adaptive user interface device 2007b may be provided on a portion revealed by opening or sliding the display portion. So configured, the mobile device 2200 may be opened to reveal an adaptive user interface device 2007b that can function either as a touch pad or as a keypad, depending upon the operating mode and user input.

The foregoing method descriptions and the process flow diagrams are provided merely as illustrative examples, and are not intended to require or imply that the steps of the various aspects must be performed in the order presented. As will be appreciated by one of skill in the art, the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible non-transitory computer-readable medium or processor-readable medium. Non-transitory computer-readable and processor-readable media may be any available media that may be accessed by a computer or processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of configuring an adaptive user interface device configured to receive user inputs, comprising:
   adapting a mode of operation of the adaptive user interface device, wherein adapting a mode of operation is selected from the group consisting of adjusting a sensitivity of the user interface device to user inputs, and changing a shape of the adaptive user interface device,
   wherein changing a shape of the adaptive user interface device comprises:
      sensing a touch input of a user's hand on a surface of the adaptive user interface device;
      recognizing one of a plurality of users of the user interface device based on a shape of the user's hand by comparing the shape of the user's hand to a plurality of stored hand shapes that correspond to the plurality of users; and
      automatically changing a shape of a portion of the surface of the adaptive user interface device based on the recognition of the one of the plurality of users, wherein changing the shape of the portion of the surface of the adaptive user interface device comprises implementing a user preference that was set by the recognized one of the plurality of users;
      guiding the user's finger in the direction of an identified acceptable location comprising the operations of:
         identifying the acceptable location on the surface of the adaptive user interface device;
         detecting a current location of the user's finger on the surface of the adaptive user interface;
         determining whether the detected current location of the user's finger is at the identified acceptable location; and
         raising a portion of the surface of the adaptive user interface device in response to determining that the detected current location of the user's finger is not at the identified acceptable location.

2. The method of claim 1, further comprising:
   sensing a user input on the adaptive user interface device;
   determining an operating mode compatible with the sensed user input; and
   implementing the identified compatible user input mode by configuring the adaptive user interface device.

3. The method of claim 1, wherein adapting a mode of operation of the adaptive user interface device comprises selecting one of a touchpad mode and a stylus activated digital tablet mode.

4. The method of claim 1, wherein automatically changing a shape of a portion of the adaptive user interface device based on the recognition of the one of the plurality of users comprises raising a button on the surface of the adaptive user interface device in a first mode and lowering the button flush with the surface of the adaptive user interface device in a second mode.

5. The method of claim 4, wherein raising a button on the surface of the adaptive user interface device comprises raising a plurality of buttons in a form of one of a keyboard, a keypad and a game interface.

6. The method of claim 4, wherein raising a button on the surface of the adaptive user interface device comprises raising a plurality of buttons in a form of a keyboard configured in size and orientation based on the recognition of the one of the plurality of users.

7. The method of claim 4, further comprising activating one or more visual elements on the surface of the adaptive user interface device.

8. The method of claim 4, further comprising:
   determining an operating state of a computing device coupled to the adaptive user interface device;
   determining a suitable configuration mode for the adaptive user interface based upon the determined current operating state; and
   implementing the determined configuration mode by raising a plurality of buttons on the surface of the adaptive user interface device with shapes and locations defined by the determined configuration mode.

9. The method of claim 8, wherein the shapes and locations of the plurality of raised buttons conveys information regarding a functionality associated with each of the raised buttons.

10. The method of claim 9, further comprising activating one or more visual elements on the surface of the adaptive user interface device in a manner that communicates information regarding the functionality associated with each of the raised buttons.

11. The method of claim 4, further comprising determining a menu state of a computing device coupled to the adaptive user interface device, wherein raising a button on the surface of the adaptive user interface device comprises raising a plurality of buttons in a format defined by the menu state.

12. The method of claim 11, wherein the menu state is specified in an application executing on the computing device.

13. The method of claim 11, further comprising:
   sensing a press of one of the plurality of buttons;
   determining a functionality associated with the pressed one of the plurality of buttons;
   executing a command in the computing device if the functionality associated with the pressed one of the plurality of buttons is determined to be an executable command; and
   changing the menu state and raising a plurality of buttons in a format defined by the changed menu state if the functionality associated with the pressed one of the plurality of buttons is determined to be a selection of another user interface menu.

14. The method of claim 13, wherein the shapes and locations of the plurality of raised buttons conveys information regarding the functionality associated with each of the raised buttons.

15. The method of claim 13, further comprising activating a plurality of visual elements on the surface of the adaptive user interface device in a manner that communicates information regarding the functionality associated with each of the plurality of buttons.

16. A computing device, comprising:
a processor;
an adaptive user interface surface coupled to the processor and configured to send signal to the processor in response to receiving a user touch to the user interface surface,
wherein the processor is configured with processor-executable instructions to perform operations comprising:
adapting a mode of operation of the user interface surface, wherein adapting a mode of operation is selected from the group consisting of adjusting a sensitivity of the adaptive user interface surface to user inputs, and changing a shape of the adaptive user interface surface,
wherein changing a shape of the adaptive user interface surface comprises:
sensing a touch input of a user's hand on a surface of the adaptive user interface device;
recognizing of one of a plurality of users of the computing device based on a shape of the user's hand by comparing the shape of the user's hand to a plurality of stored hand shapes that correspond to the plurality of users; and
automatically changing a shape of a portion of the surface of the adaptive user interface surface based on the recognition of the one of the plurality of users, wherein changing the shape of the portion of the surface of the adaptive user interface device comprises implementing a user preference that was set by the recognized one of the plurality of users;
guiding the user's finger in the direction of an identified acceptable location comprising the operations of:
identifying the acceptable location on the surface of the adaptive user interface device;
detecting a current location of the user's finger on the surface of the adaptive user interface;
determining whether the detected current location of the user's finger is at the identified acceptable location; and
raising a portion of the surface of the adaptive user interface device in response to determining that the detected current location of the user's finger is not at the identified acceptable location.

17. The computing device of claim 16, wherein the processor is configured with processor-executable instructions to perform operations further comprising:
receiving a signal from the adaptive user interface surface indicating a user input on the user interface surface;
determining an operating mode compatible with the indicated user input; and
implementing the identified compatible user input mode by configuring the adaptive user interface surface.

18. The computing device of claim 16, wherein the processor is configured with processor-executable instructions to perform operations such that adapting a mode of operation of the adaptive user interface surface comprises selecting one of a touchpad mode and a stylus activated digital tablet mode.

19. The computing device of claim 16, wherein the processor is configured with processor-executable instructions to perform operations and the adaptive user interface surface is configured such that automatically changing a shape of a portion of the adaptive user interface surface comprises raising a button on the adaptive user interface surface in a first mode and lowering the button flush with the adaptive user interface surface in a second mode.

20. The computing device of claim 19, wherein the processor is configured with processor-executable instructions to perform operations and the adaptive user interface surface is configured such that raising a button on the adaptive user interface surface comprises raising a plurality of buttons in a form of one of a keyboard, a keypad and a game interface.

21. The computing device of claim 19, wherein the processor is configured with processor-executable instructions to perform operations and the adaptive user interface surface is configured such that raising a button on the adaptive user interface surface comprises raising a plurality of buttons in a form of a keyboard configured in size and orientation based on the recognition of the one of the plurality of users.

22. The computing device of claim 19, wherein:
the adaptive user interface surface further comprises one or more visual elements coupled to the processor; and
the processor is configured with processor-executable instructions to perform operations further comprising activating the one or more visual elements on the adaptive user interface surface.

23. The computing device of claim 19, wherein the processor is configured with processor-executable instructions to perform operations further comprising:
determining an operating state of the computing device;
determining a suitable configuration mode for the user surface based upon the determined current operating state; and
implementing the determined configuration mode by sending signals to the adaptive user interface surface to cause it to raise a plurality of buttons with shapes and locations defined by the determined configuration mode.

24. The computing device of claim 23, wherein the processor is configured with processor-executable instructions to perform operations such that the shapes and locations of the plurality of raised buttons conveys information regarding a functionality associated with each of the raised buttons.

25. The computing device of claim 24, wherein:
the adaptive user interface surface further comprises one or more visual elements coupled to the processor; and
the processor is configured with processor-executable instructions to perform operations further comprising activating the one or more visual elements on the adaptive user interface surface in a manner that communicates information regarding the functionality associated with each of the raised buttons.

26. The computing device of claim 19, wherein the processor is configured with processor-executable instructions to perform operations further comprising determining a menu state of the computing device, wherein raising a button on the adaptive user interface surface comprises raising a plurality of buttons in a format defined by the menu state.

27. The computing device of claim 26, wherein the processor is configured with processor-executable instructions to perform operations such that the menu state is specified in an application executing on the computing device.

28. The computing device of claim 26, wherein the processor is configured with processor-executable instructions to perform operations further comprising:

receiving a signal from the adaptive user interface surface indicating a press of one of the plurality of buttons;

determining a functionality associated with the pressed one of the plurality of buttons;

executing a command in the computing device if the functionality associated with the pressed one of the plurality of buttons is determined to be an executable command; and changing the menu state and sending signals to the adaptive user interface surface to raise a plurality of buttons in a format defined by the changed menu state if the functionality associated with the pressed one of the plurality of buttons is determined to be a selection of another user interface menu.

29. The computing device of claim 28, wherein the processor is configured with processor-executable instructions to perform operations such that the shapes and locations of the plurality of raised buttons conveys information regarding the functionality associated with each of the raised buttons.

30. The computing device of claim 28, wherein:

the adaptive user interface surface comprises a plurality of visual elements coupled to the processor; and the processor is configured with processor-executable instructions to perform operations further comprising activating the plurality of visual elements on the adaptive user interface surface in a manner that communicates information regarding the functionality associated with each of the plurality of buttons.

31. The computing device of claim 16, wherein the adaptive user interface surface comprises a piezoelectric actuator configured to raise a portion of the adaptive user interface surface in response to signals received from the processor.

32. The computing device of claim 16, wherein the adaptive user interface surface comprises Macro Fiber Composite elements comprising rectangular piezo ceramic rods sandwiched between layers of adhesive and electroded polyimide film.

33. The computing device of claim 16, wherein the adaptive user interface surface comprises: a fluid pocket; a valve coupled to the fluid pocket and to the processor and configured to open and close in response to signals received from the processor; and a fluid pump fluidic ally coupled to the valve.

34. The computing device of claim 16, wherein the adaptive user interface surface comprises an electrostatically activated portion electrically coupled to the processor.

35. The computing device of claim 34, wherein the electrostatically activated portion comprises first and second surface layers separated by an insulator layer, wherein the first and second surface layers are electrically coupled to the processor so that the processor can selectively apply same or different voltages to the first and second surface layers, and wherein the processor is configured with processor-executable instructions to perform operations further comprising applying voltages of a same polarity to the first and second surface layers to raise the electrostatically activated portion.

36. The computing device of claim 16, wherein the adaptive user interface surface comprises a magnetically activated portion electrically coupled to the processor.

37. The computing device of claim 36, wherein the magnetically activated portion comprises a permanent magnet and an electromagnet separated by a separator layer, wherein the electromagnet is electrically coupled to the processor so that the processor can generate a magnetic field by applying a current to the electromagnet, and wherein the processor is configured with processor-executable instructions to perform operations further comprising applying a current to the electromagnet to raise the magnetically activated portion of the adaptive user interface surface.

38. A computing device, comprising:

means for adapting a mode of operation of the adaptive user interface device, wherein adapting a mode of operation is selected from the group consisting of means for adjusting a sensitivity of the user interface device to user inputs, and means for changing a shape of the adaptive user interface device, wherein means for changing a shape of the adaptive user interface device comprises:

means for sensing a touch input of a user's hand on a surface of the adaptive user interface device;

means for recognizing one of a plurality of users of the user interface device based on a shape of the user's hand comprising means for comparing the shape of the user's hand to a plurality of stored hand shapes that correspond to the plurality of users; and means for automatically changing a shape of a portion of the surface of the adaptive user interface device based on the recognition of the one of the plurality of users, wherein means for automatically changing the shape of the portion of the surface of the adaptive user interface device comprises means for implementing a user preference that was set by the recognized one of the plurality of users;

means for guiding the user's finger in the direction of an identified acceptable location comprising:

means for identifying the acceptable location on the surface of the adaptive user interface device;

means for detecting a current location of the user's finger on the surface of the adaptive user interface;

means for determining whether the detected current location of the user's finger is at the identified acceptable location; and means for raising a portion of the surface of the adaptive user interface device in response to determining that the detected current location of the user's finger is not at the identified acceptable location.

39. The computing device of claim 38, further comprising:

means for sensing a user input on the adaptive user interface device;

means for determining an operating mode compatible with the sensed user input; and means for implementing the identified compatible user input mode by configuring the adaptive user interface device.

40. The computing device of claim 38, wherein means for adapting a mode of operation of the adaptive user interface device comprises means for selecting one of a touchpad mode and a stylus activated digital tablet mode.

41. The computing device of claim 38, wherein means for automatically changing a shape of a portion of the adaptive user interface device based on the recognition of the one of the plurality of users comprises means for raising a button on the surface of the adaptive user interface device in a first mode and lowering the button flush with the surface of the adaptive user interface device in a second mode.

42. The computing device of claim 41, wherein means for raising a button on the surface of the adaptive user interface device comprises means for raising a plurality of buttons in a form of one of a keyboard, a keypad and a game interface.

43. The computing device of claim 41, wherein means for raising a button on the surface of the adaptive user interface device comprises means for raising a plurality of buttons in a form of a keyboard configured in size and orientation based on the recognition of the one of the plurality of users.

44. The computing device of claim 41, further comprising means for activating one or more visual elements on the surface of the adaptive user interface device.

45. The computing device of claim 41, further comprising:
means for determining an operating state of a computing device coupled to the adaptive user interface device;
means for determining a suitable configuration mode for the adaptive user interface based upon the determined current operating state; and
means for implementing the determined configuration mode by raising a plurality of buttons on the surface of the adaptive user interface device with shapes and locations defined by the determined configuration mode.

46. The computing device of claim 45, wherein the shapes and locations of the plurality of raised buttons conveys information regarding a functionality associated with each of the raised buttons.

47. The computing device of claim 46, further comprising activating one or more visual elements on the surface of the adaptive user interface device in a manner that communicates information regarding the functionality associated with each of the raised buttons.

48. The computing device of claim 38, further comprising determining a menu state of a computing device coupled to the adaptive user interface device, wherein raising a button on the surface of the adaptive user interface device comprises raising a plurality of buttons in a format defined by the menu state.

49. The computing device of claim 48, wherein the menu state is specified in an application executing on the computing device.

50. The computing device of claim 48, further comprising:
sensing a press of one of the plurality of buttons;
determining a functionality associated with the pressed one of the plurality of buttons;
executing a command in the computing device if the functionality associated with the pressed one of the plurality of buttons is determined to be an executable command; and
changing the menu state and raising a plurality of buttons in a format defined by the changed menu state if the functionality associated with the pressed one of the plurality of buttons is determined to be a selection of another user interface menu.

51. The computing device of claim 50, wherein the shapes and locations of the plurality of raised buttons conveys information regarding the functionality associated with each of the raised buttons.

52. The computing device of claim 51, further comprising activating a plurality of visual elements on the surface of the adaptive user interface device in a manner that communicates information regarding the functionality associated with each of the plurality of buttons.

53. The computing device of claim 41, wherein means for raising a button on the surface of the adaptive user interface device comprises means for raising a portion of the user interface using a piezoelectric actuator.

54. The computing device of claim 41, wherein means for raising a button on the surface of the adaptive user interface device comprises means for hydraulically raising a portion of the user interface.

55. The computing device of claim 41, wherein means for raising a button on the surface of the adaptive user interface device comprises means for electrostatically raising a portion of the user interface.

56. The computing device of claim 41, wherein means for raising a button on the surface of the adaptive user interface device comprises means for magnetically raising a portion of the user interface.

57. A non-transitory processor-readable storage medium having stored thereon processor-executable instructions configured to cause a processor of a computing device coupled to an adaptive user interface surface to perform operations comprising:
adapting a mode of operation of the adaptive user interface surface, wherein adapting a mode of operation is selected from the group consisting of adjusting a sensitivity of the adaptive user interface surface to user inputs, and changing a shape of the adaptive user interface surface,
wherein changing a shape of the adaptive user interface surface comprises:
sensing a touch input of a user's hand on a surface of the adaptive user interface device;
recognizing one of a plurality of users of the computing device based on a shape of the user's hand by comparing the shape of the user's hand to a plurality of stored hand shapes that correspond to the plurality of users; and
automatically changing a shape of a portion of the surface of the adaptive user interface device based on the recognition of the one of the plurality of users, wherein changing the shape of the portion of the surface of the adaptive user interface device comprises implementing a user preference that was set by the recognized one of the plurality of users;
guiding the user's finger in the direction of an identified acceptable location comprising the operations of:
identifying the acceptable location on the surface of the adaptive user interface device;
detecting a current location of the user's finger on the surface of the adaptive user interface;
determining whether the detected current location of the user's finger is at the identified acceptable location; and
raising a portion of the surface of the adaptive user interface device in response to determining that the detected current location of the user's finger is not at the identified acceptable location.

58. The non-transitory processor-readable storage medium of claim 57, wherein the stored processor-executable instructions are configured to cause the processor to perform operations further comprising:
receiving a signal from the adaptive user interface surface indicating a user input on the adaptive user interface surface;
determining an operating mode compatible with the indicated user input; and
implementing the identified compatible user input mode by configuring the adaptive user interface surface.

59. The non-transitory processor-readable storage medium of claim 57, wherein the stored processor-executable instructions are configured to cause the processor to perform operations such that adapting a mode of operation of the adaptive user interface surface comprises selecting one of a touchpad mode and a stylus activated digital tablet mode.

60. The non-transitory processor-readable storage medium of claim 57, wherein the stored processor-executable instructions are configured to cause the processor to perform operations such that automatically changing a shape of a portion of the adaptive user interface surface based on the recognition of the one of the plurality of users comprises raising a button on the adaptive user interface surface in a first mode and lowering the button flush with the adaptive user interface surface in a second mode.

61. The non-transitory processor-readable storage medium of claim 60, wherein the stored processor-executable instructions are configured to cause the processor to perform operations such that raising a button on the adaptive user interface surface comprises raising a plurality of buttons in a form of one of a keyboard, a keypad and a game interface.

62. The non-transitory processor-readable storage medium of claim 60, wherein the stored processor-executable instructions are configured to cause the processor to perform operations such that raising a button on the adaptive user interface surface comprises raising a plurality of buttons in a form of a keyboard configured in size and orientation based on the recognition of the one of the plurality of users.

63. The non-transitory processor-readable storage medium of claim 60, wherein the stored processor-executable instructions are configured to cause the processor to perform operations further comprising activating the one or more visual elements on the adaptive user interface surface.

64. The non-transitory processor-readable storage medium of claim 60, wherein the stored processor-executable instructions are configured to cause the processor to perform operations further comprising:
 determining an operating state of the computing device;
 determining a suitable configuration mode for the user surface based upon the determined current operating state; and
 implementing the determined configuration mode by sending signals to the adaptive user interface surface to cause it to raise a plurality of buttons with shapes and locations defined by the determined configuration mode.

65. The non-transitory processor-readable storage medium of claim 64, wherein the stored processor-executable instructions are configured to cause the processor to perform operations such that the shapes and locations of the plurality of raised buttons conveys information regarding a functionality associated with each of the raised buttons.

66. The non-transitory processor-readable storage medium of claim 65, wherein the stored processor-executable instructions are configured to cause the processor to perform operations further comprising activating the one or more visual elements on the adaptive user interface surface in a manner that communicates information regarding the functionality associated with each of the raised buttons.

67. The non-transitory processor-readable storage medium of claim 60, wherein the stored processor-executable instructions are configured to cause the processor to perform operations further comprising determining a menu state of the computing device, wherein raising a button on the adaptive user interface surface comprises raising a plurality of buttons in a format defined by the menu state.

68. The non-transitory processor-readable storage medium of claim 67, wherein the stored processor-executable instructions are configured to cause the processor to perform operations such that the menu state is specified in an application executing on the computing device.

69. The non-transitory processor-readable storage medium of claim 67, wherein the stored processor-executable instructions are configured to cause the processor to perform operations further comprising:
 receiving a signal from the adaptive user interface surface indicating a press of one of the plurality of buttons;
 determining a functionality associated with the pressed one of the plurality of buttons;
 executing a command in the computing device if the functionality associated with the pressed one of the plurality of buttons is determined to be an executable command; and
 changing the menu state and sending signals to the adaptive user interface surface to raise a plurality of buttons in a format defined by the changed menu state if the functionality associated with the pressed one of the plurality of buttons is determined to be a selection of another user interface menu.

70. The non-transitory processor-readable storage medium of claim 69, wherein the stored processor-executable instructions are configured to cause the processor to perform operations such that the shapes and locations of the plurality of raised buttons conveys information regarding the functionality associated with each of the raised buttons.

71. The non-transitory processor-readable storage medium of claim 69, wherein the stored processor-executable instructions are configured to cause the processor to perform operations further comprising activating the plurality of visual elements on the adaptive user interface surface in a manner that communicates information regarding the functionality associated with each of the plurality of buttons.

72. An adaptive user interface device, comprising:
 a user interface surface configured to automatically change a shape based on recognition of one of a plurality of users of the user interface device in response to a signal from a processor coupled to the adaptive user interface device, wherein the processor is configured with processor-executable instructions configured to perform operations comprising:
  sensing a touch input of a user's hand on a surface of the adaptive user interface device;
  recognizing the one of the plurality of users based on a shape of the user's hand by comparing the shape of the user's hand to a plurality of stored hand shapes that correspond to the plurality of users; and
  transmitting the signal in response to recognizing the identity, of the one of the plurality of users, wherein changing the shape of the user interface surface comprises implementing a user preference that was set by the recognized one of the plurality of users;
  guiding the user's finger in the direction of an identified acceptable location comprising the operations of:
   identifying the acceptable location on the surface of the adaptive user interface device;
   detecting a current location of the user's finger on the surface of the adaptive user interface;
   determining whether the detected current location of the user's finger is at the identified acceptable location; and
   raising a portion of the surface of the adaptive user interface device in response to determining that the detected current location of the user's finger is not at the identified acceptable location.

73. The adaptive user interface device of claim 72, wherein the user interface surface further comprises one or more visual elements configured to generate a visual image in response to a signal from a processor coupled to the adaptive user interface device.

74. The adaptive user interface device of claim 72, wherein the user interface surface comprises an actuator configured to raise a portion of the user interface surface in a first mode and lowering the portion of the surface flush with the user interface surface in a second mode.

75. The adaptive user interface device of claim 74, wherein the user interface surface comprises a plurality of actuators in a form of one of a keyboard, a keypad and a game interface.

76. The adaptive user interface device of claim 74, wherein the plurality of actuators are configured to raise a plurality of buttons in a form of a keyboard configured in size and orientation based on the recognition of the one of the plurality of users.

77. The adaptive user interface device of claim 74, wherein the user interface surface comprises a plurality of actuators controllable by a processor coupled to the adaptive user interface device and configured to be individually actuated to each raise a portion of an exterior of the user interface surface in response to signals from a processor coupled to the adaptive user interface device.

78. The adaptive user interface device of claim 74, wherein the user interface surface is configured to detect a press of a raised portion of the user interface surface, and send a signal to the processor coupled to the adaptive user interface device indicating that the raised portion of the user interface surface was pressed.

79. The adaptive user interface device of claim 74, wherein the actuator comprises a piezoelectric actuator.

80. The adaptive user interface device of claim 79, wherein the piezoelectric actuator comprises a Macro Fiber Composite element comprising rectangular piezo ceramic rods sandwiched between layers of adhesive and electroded polyimide film.

81. The adaptive user interface device of claim 74, wherein the actuator comprises:
 a fluid pocket;
 a valve coupled to the fluid pocket and configured to open and close in response to signals received from the processor coupled to the adaptive user interface device; and
 a fluid pump fluidic ally coupled to the valve.

82. The adaptive user interface device of claim 74, wherein the actuator comprises an electrostatic actuator.

83. The adaptive user interface device of claim 82, wherein the electrostatic actuator comprises first and second surface layers separated by an insulator layer, wherein the first and second surface layers are electrically coupled to the processor so that the processor can selectively apply same or different voltages to the first and second surface layers.

84. The adaptive user interface device of claim 74, wherein the user interface surface comprises a magnetic actuator.

85. The adaptive user interface device of claim 84, wherein the magnetic actuator comprises a permanent magnet and an electromagnet separated by a separator layer, wherein the electromagnet is electrically coupled to the processor so that the processor can generate a magnetic field by applying a current to the electromagnet.

86. An adaptive user interface device, comprising:
 a user interface surface; and
 means for automatically changing shape of the user interface surface based on recognition of one of a plurality of users of the user interface device in response to a signal from a processor coupled to the adaptive user interface device, wherein means for automatically changing shape of the user interface surface comprises:
  means for sensing a touch input of a user's hand on a surface of the adaptive user interface device;
  means for recognizing the one of the plurality of users based on a shape of the user's hand comprising means for comparing the shape of the user's hand to a plurality of stored hand shapes that correspond to the plurality of users;
  means for transmitting the signal in response to recognizing the identity of tile one of the plurality of users, wherein recognizing the identity is based on a shape of the user's hand;
  means for implementing a user preference that was set by the recognized one of the plurality of users
  means for guiding the user's finger in the direction of an identified acceptable location comprising:
   means for identifying the acceptable location on the surface of the adaptive user interface device;
   means for detecting a current location of the user's finger on the surface of the adaptive user interface;
   means for determining whether the detected current location of the user's finger is at the identified acceptable location; and
   means for raising a portion of the surface of the adaptive user interface device in response to determining that the detected current location of the user's finger is not at the identified acceptable location.

87. The adaptive user interface device of claim 86, further comprising means for generating a visual image in response to a signal from a processor coupled to the adaptive user interface device.

88. The adaptive user interface device of claim 86, wherein the user interface surface comprises means for raising a portion of the user interface surface in a first mode and lowering the portion of the surface flush with the user interface surface in a second mode.

89. The adaptive user interface device of claim 88, wherein the user interface surface comprises means for raising a plurality of buttons in a form of one of a keyboard, a keypad and a game interface.

90. The adaptive user interface device of claim 88, wherein means for raising a plurality of buttons comprises means for raising a plurality of buttons in a form of a keyboard configured in size and orientation based on the recognition of the one of the plurality of users.

91. The adaptive user interface device of claim 86, means for individually raising small portions of the user interface surface in response to signals received from the processor coupled to the adaptive user interface device.

92. The adaptive user interface device of claim 88, further comprising:
 means for detecting a press of a raised portion of the user interface surface; and
 means for sending a signal to the processor coupled to the adaptive user interface device indicating that the raised portion of the user interface surface was pressed.

93. The method of claim 1, wherein guiding the user's finger in the direction of an identified acceptable location further comprises iteratively guiding the user's finger such that the user's finger is incrementally guided in the direction of the identified acceptable location.

94. The computing device of claim 16, wherein the processor is configured with processor-executable instructions to perform operations such that guiding the user's finger in the direction of an identified acceptable location further comprises iteratively guiding the user's finger such that the user's finger is incrementally guided in the direction of the identified acceptable location.

95. The computing device of claim 38, wherein means for guiding the user's finger in the direction of the identified acceptable location further comprises:
 means for iteratively guiding the user's finger such that the user's finger is incrementally guided in the direction of the identified acceptable location.

96. The non-transitory processor-readable storage medium of claim 57, wherein the stored processor-executable instructions are configured to cause the processor to perform operations such that guiding the user's finger in the direction of the identified acceptable location further comprises iteratively guiding the user's finger such that the user's finger is incrementally guided in the direction of the identified acceptable location.

* * * * *